United States Patent
Lin et al.

(10) Patent No.: US 11,261,316 B2
(45) Date of Patent: **\*Mar. 1, 2022**

(54) PLASTIC LIVING HINGES WITH BLOCK COMPOSITE POLYMER

(71) Applicant: Dow Global Technologies LLC, Midland, MI (US)

(72) Inventors: Yijian Lin, Pearland, TX (US); Yushan Hu, Pearland, TX (US); Todd A. Hogan, Midland, MI (US); Colin Li Pi Shan, Pearland, TX (US); Keran Lu, Lake Jackson, TX (US); Mridula Kapur, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/626,041

(22) PCT Filed: Jun. 25, 2018

(86) PCT No.: PCT/US2018/039319
§ 371 (c)(1),
(2) Date: Dec. 23, 2019

(87) PCT Pub. No.: WO2019/005681
PCT Pub. Date: Jan. 3, 2019

(65) Prior Publication Data
US 2020/0123355 A1   Apr. 23, 2020

Related U.S. Application Data

(60) Provisional application No. 62/526,546, filed on Jun. 29, 2017.

(51) Int. Cl.
| | | |
|---|---|---|
| *C08J 5/18* | (2006.01) | |
| *C08L 23/08* | (2006.01) | |
| *C08L 23/06* | (2006.01) | |
| *C08L 53/00* | (2006.01) | |
| *E05D 1/02* | (2006.01) | |

(52) U.S. Cl.
CPC .............. *C08L 23/06* (2013.01); *C08L 53/00* (2013.01); *E05D 1/02* (2013.01); *C08L 2205/025* (2013.01); *C08L 2205/035* (2013.01); *C08L 2207/062* (2013.01)

(58) Field of Classification Search
CPC .......... C08L 23/04; C08L 23/06; C08L 23/08; C08L 23/0815; C08L 23/10; C08L 23/12; C08L 23/14; C08L 23/142; C08L 53/00; C08L 2205/03; C08L 2205/035; F16C 11/00; E05D 1/02; Y10S 16/52; Y10S 16/13

See application file for complete search history.

(56) References Cited

U.S. PATENT DOCUMENTS

| | | |
|---|---|---|
| 5,677,383 A | 10/1997 | Chum et al. |
| 5,919,983 A | 7/1999 | Rosen et al. |
| 6,111,023 A | 8/2000 | Chum et al. |
| 6,984,695 B2 | 1/2006 | Brown et al. |
| 7,951,882 B2 | 5/2011 | Arriola et al. |
| 8,053,529 B2 | 11/2011 | Carnahan et al. |
| 8,445,594 B2 | 5/2013 | Michie et al. |
| 8,501,885 B2 | 8/2013 | Arriola et al. |
| 8,686,087 B2 | 4/2014 | LiPiShan et al. |
| 8,716,400 B2 | 5/2014 | Carnahan et al. |
| 9,511,567 B2 | 12/2016 | Hu et al. |
| 2011/0313106 A1 | 12/2011 | LiPiShan et al. |
| 2011/0313108 A1 | 12/2011 | LiPiShan et al. |
| 2013/0177720 A1 | 7/2013 | Liang et al. |
| 2013/0186465 A1 | 7/2013 | Liang et al. |
| 2013/0331496 A1 | 12/2013 | Domoy et al. |
| 2013/0343808 A1 | 12/2013 | Domoy et al. |
| 2016/0222199 A1 | 8/2016 | Rycroft et al. |
| 2017/0342244 A1 | 11/2017 | Whited et al. |

FOREIGN PATENT DOCUMENTS

WO    WO2016093987 A1 *  6/2016

\* cited by examiner

*Primary Examiner* — Irina S Zemel
*Assistant Examiner* — Jeffrey S Lenihan
(74) *Attorney, Agent, or Firm* — Quarles & Brady LLP

(57) ABSTRACT

The present disclosure provides a plastic living hinge. The plastic living hinge includes a blend containing (A) an ethylene-based polymer; and (B) a composite component selected from the group consisting of a block composite, a crystalline block composite, and a combination thereof.

10 Claims, 3 Drawing Sheets

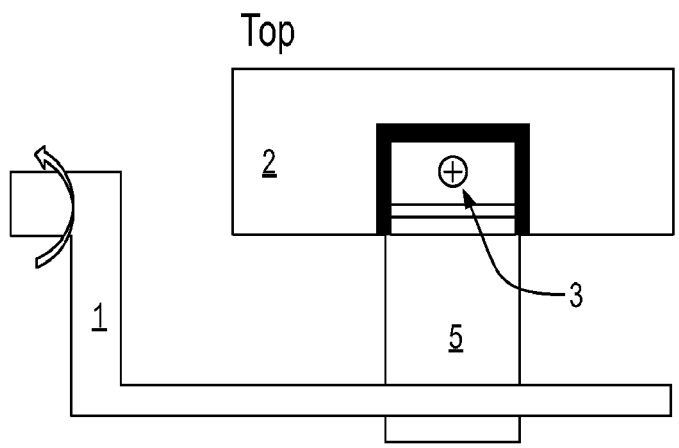
Figure 2A
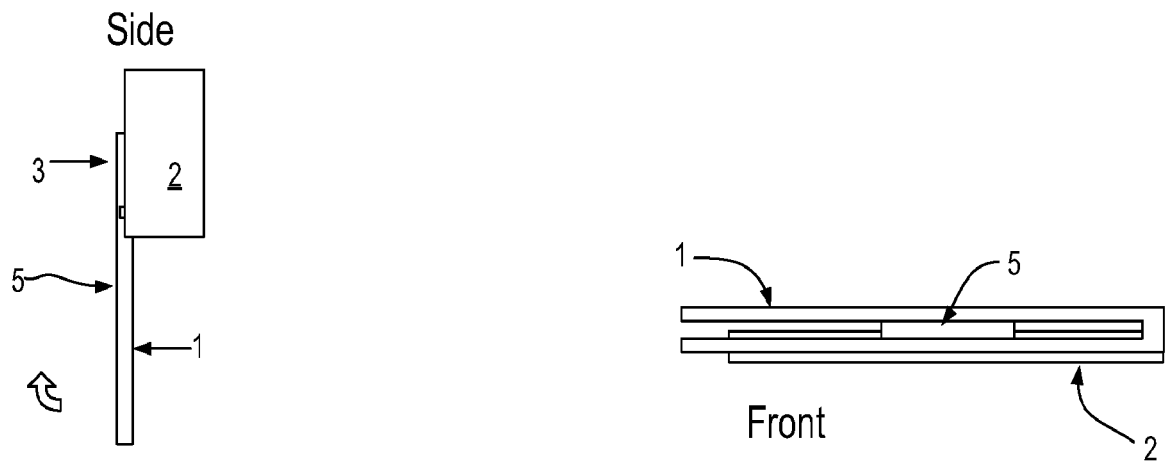
Figure 2B
Figure 2C
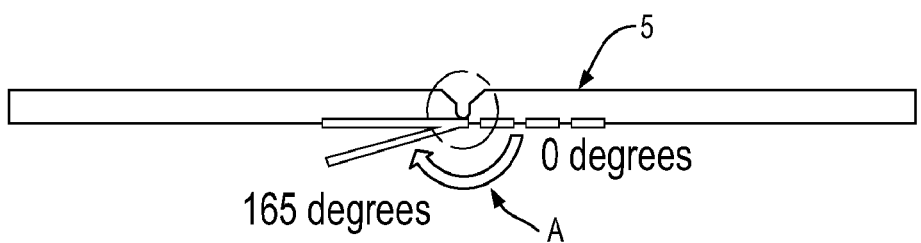
Figure 3

PLASTIC LIVING HINGES WITH BLOCK COMPOSITE POLYMER

BACKGROUND

The present disclosure relates to plastic living hinges.

A living hinge is a thin, flexible hinge connecting two relatively rigid parts. It is usually made from the same material as the rigid parts. A living hinge may be used to join rigid parts of a container, allowing the counter parts to bend along the line of the hinge. Polypropylene has traditionally dominated the plastic living hinge dispensing closure market as it is easily processed, has good hinge durability characteristics, and is widely available. However, plastic living hinges containing polypropylene typically exhibit poor low temperature impact strength that may lead to breakage upon handling, packaging, and shipping. High density polyethylene (HDPE) is widely available and exhibits better low temperature impact than polypropylene. However, HDPE is known to exhibit lower hinge durability than polypropylene.

The art recognizes the need for a plastic living hinge containing HDPE that exhibits suitable hinge durability and suitable low temperature impact strength for consumer and industrial applications.

SUMMARY

The present disclosure provides a living hinge. The plastic living hinge includes a blend containing (A) an ethylene-based polymer; and (B) a composite component selected from the group consisting of a block composite, a crystalline block composite, and a combination thereof.

BRIEF DESCRIPTION OF THE DRAWINGS

FIG. 2A is a top plan view of an automated hinge cycler in accordance with an embodiment of the present disclosure.

FIG. 2B is a side elevation view of the automated hinge cycler of FIG. 2A.

FIG. 2C is a front elevation view of the automated hinge cycler of FIG. 2A.

FIG. 3 is a front elevation view of a plastic living hinge in accordance with an embodiment of the present disclosure.

DEFINITIONS

Figure 1A:
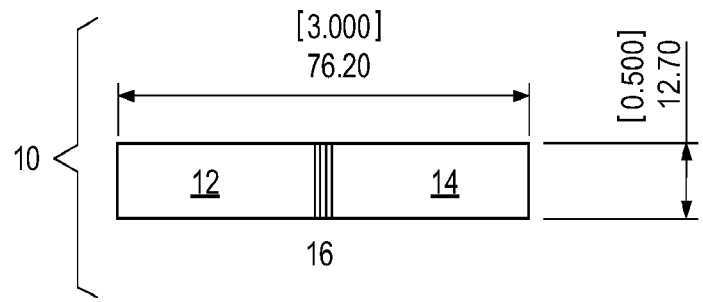
FIG. 1A is a top plan view of a plastic living hinge in accordance with an embodiment of the present disclosure.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers.

Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of both polymer polydispersity (PDI or Mw/Mn) and block length distribution, due to the effect of shuttling agent(s) in combination with the catalyst(s) employed in their preparation.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymerthus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer. m-LLDPE has density from 0.913 g/cc to less than 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

1% Secant flexural modulus is measured according to ASTM D790 using Type I ASTM bars, with a testing speed of 1.3 mm/min (0.05 inches/min).

Density is measured in accordance with ASTM D792, Method B. The result is recorded in grams per cubic centimeter (g/cc).

Figure 4:
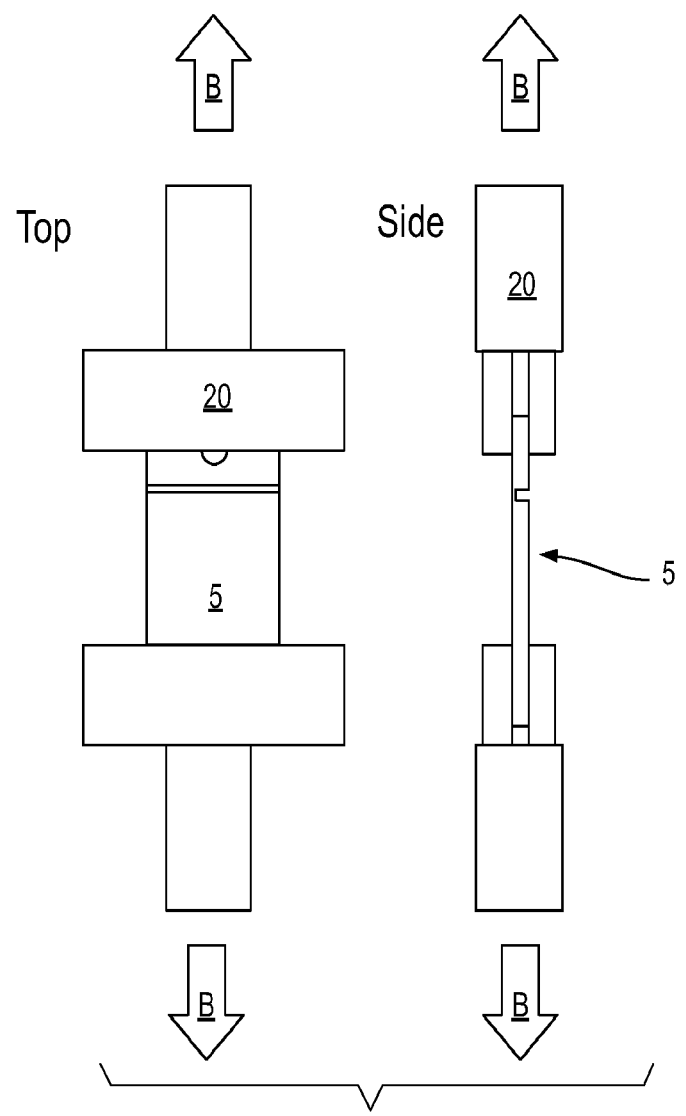
FIG. 4 is a schematic representation of a tensile load frame in accordance with an embodiment of the present disclosure.

Hinge cycled tensile strength is measured using tensile tests. Living hinge strips are cut and modified such that they can be secured to an automated hinge cycler. The cuts are made such that the hinge region is not affected. FIGS. 2A, 2B and 2C depict an automated hinge cycler. One side of the plastic living hinge 5 is secured to a grooved sample stage 2 of the automated hinge cycler via a screw 3. The other side of the plastic living hinge 5 is placed in the mechanical arm 1 of the automated hinge cycler, as shown in FIGS. 2A and 2C. The mechanical arm 1 applies torque to the plastic living hinge 5 and actuates it. The automated hinge cycler actuates the plastic living hinge 5 from 0° to 165°, as shown in FIG. 3. This angle is measured such that the angle vertex rests at the center of the hinge region on the large flat face of the plastic living hinge 5. During actuation, the mechanical arm 1 is folded at the hinge such that the flat surface of the plastic living hinge 5 folds in a concave fashion. A hold time of 1 second is applied upon reaching 0° and upon reaching 165° during each cycle. One cycle is one opening and one closing of the plastic living hinge 5. After actuating for the desired number of cycles (100 cycles, 1000 cycles, or 5000 cycles), the plastic living hinge 5 is removed from the automated hinge cycler and loaded into a tensile load frame with pneumatic clamps 20, as shown in FIG. 4. Opposing ends of the plastic living hinge 5 are clamped so that the hinge region is not effected. Each pneumatic clamp 20 is pulled in the direction of the arrow B, as shown in FIG. 4. The hinge cycled tensile strength at failure is measured at a tensile speed of 50 mm/min. Hinge cycle tensile strength is reported in Newtons (N).

Hinge tensile strength retention ratio after 1,000 cycles is measured in accordance with the following equation:

$$\text{Hinge Tensile Strength Retention Ratio After 1000 Cycles} = \frac{\text{hinge cycled tension strength after 1000 cycles}}{\text{hinge cycled tension strength after 100 cycles}}$$

Hinge tensile strength retention ratio after 5,000 cycles is measured in accordance with the following equation:

$$\text{Hinge Tensile Strength Retention Ratio After 5000 Cycles} = \frac{\text{hinge cycled tension strength after 5000 cycles}}{\text{hinge cycled tension strength after 100 cycles}}$$

Instrumented Dart Impact (IDI) strength is measured at −20° C., 0° C., and 23° C. in accordance with ASTM D3763. Specimens are 102 mm diameter disks with a 3.2 mm thickness. Specimens are tested at an impact velocity of 6.7 meters/second. Five specimens of each sample are tested. IDI load at peak refers to the maximum force sustained by the sample disc prior to failure. IDI total energy dissipation is refers to the net energy absorbed by the disc from the impactor. IDI failure indicates whether the IDI disc failed in a brittle or ductile manner. A failure mode of "5D" indicates five ductile failures; "5B" indicates five brittle failures; "4D/1B" indicates four ductile failures and one brittle failure; and "1D/4B" indicates one ductile failure and four brittle failures.

Melt flow rate (MFR) is measured according to ASTM D1238 (230° C./2.16 kg). The result is reported in grams eluted per 10 minutes (g/10 min).

Melt index (MI) (I2) in g/10 min is measured using ASTM D1238 (190° C./2.16 kg). Melt index (MI) (I10) in g/10 min is measured using ASTM D1238 (190° C./10 kg).

Notched Izod Impact Strength is measured at 0° C. and 23° C. in accordance with ASTM D256. Noted Izod specimens are injection molded according to ASTM D3641 to dimensions of 64 mm×12.7 mm×3.2 mm. A 45°, V-shaped notch is cut into the specimen to a depth of 10.2 mm with a radius at the notch tip of 0.25 mm using a Ceast AN50 notcher. Five specimens of each sample are tested. Notched Izod complete average strength refers to the total energy absorbed by the specimen normalized by specimen thickness in which the specimen breaks completely. Notched Izod partial average strength refers to the total energy absorbed by the specimen normalized by specimen thickness in which the specimen only partially breaks. Notches Izod break type refers to a complete or partial break. A break type of "5C" indicates five complete breaks; and "5P" indicates five partial breaks.

Shrinkage in the machine direction (MD) and cross direction (CD) is defined as the ratio of injection molded part dimension to the corresponding dimension of the mold used to create the part. Injection molded samples are produced on a Toyo 90 ton electric injection molding machine. The mold is a 2 cavity ISO butterfly 60 mm×60 mm×2 mm plaque insert. The plaques have a fan gate across the part. The mold is heated to 23.9° C. using water and an external Matsui mold controller. Parts are cut off at Gate and measured 72 hours after molding in both the fill and cross flow directions. Conditioning is 22.2° C. at 50% relative humidity.

Tensile break strain (%), tensile chord modulus (MPa), and tensile yield strength (MPa) are measured in accordance with the ASTM D638 testing procedure on injection molded Type I ASTM bars. Elongation at break, or elongation to break, or break strain, is the strain on a sample when it breaks, expressed as a percent. The chord modulus is taken between the strain values of 0.05% and 0.25%.

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100

The heat of fusion ($H_f$) (also known as melt enthalpy) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

Gel Permeation Chromatography (GPC)

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 µl. A "2 mg/mL" sample concentration is prepared by dissolving the sample in $N_2$ purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N.Y. Hellman, & P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}, \quad (\text{Eq 1})$$

where $M_{pp}$ is PP equivalent MW, $M_{PS}$ is PS equivalent MW, log K and a values of Mark-Houwink coefficients for PP and PS are listed below.

| Polymer | α | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum^i wf_i}{\sum^i (Wf_i / M_i)}, \quad (\text{Eq 2})$$

$$M_w = \frac{\sum^i (Wf_i * M_i)}{\sum^i (Wf_i)}, \quad (\text{Eq 3})$$

3), where $Wf_i$ and $M_i$ are the weight fraction and molecular weight of elution component i, respectively.

High Temperature Liquid Chromatography (HTLC)

High Temperature Liquid Chromatography (HTLC) Experimental Method Instrumentation is performed according to the published method of D. Lee et al., *J. Chromatogr. A* 2011, 1218, 7173, with minor modifications. Two Shimadzu (Columbia, Md., USA) LC-20AD pumps are used to deliver decane and trichlorobenzene (TCB), respectively. Each pump is connected to a 10:1 fixed flow splitter (Part #: 620-PO20-HS, Analytical Scientific Instruments Inc., CA, USA). The splitter has a pressure drop of 1500 psi (10.34 MPa) at 0.1 mL/min in $H_2O$ according to the manufacturer. The flow rate of both pumps is set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-µL mixer (Shimadzu) is connected after the splitters to mix the solvents from the Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µL sample loops. The valve is used to continuously sample eluent from the first dimension (D1) HTLC column to the second dimension (D2) SEC column. The pump of Waters GPCV2000 and a PLgel Rapid™-M column (10× 100 mm, 5 µm particle size) are connected to the VICI valve for D2 size exclusion chromatography (SEC). The symmetric configuration is used for the connections as described in the literature (Y. Brun & P. Foster, J. Sep. Sci. 2010, 33, 3501). A dual-angle light scattering detector (PD2040, Agilent, Santa Clara, Calif., USA) and an IR5 inferred absorbance detector are connected after the SEC column for measurement of concentration, composition, and molecular weight.

Separation for HTLC:

Approximately 30 mg are dissolved in 8-m L decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IR5 detectors are maintained at 140° C. throughout the separation.

The initial conditions before injection are as follows: flow rate for the HTLC column is 0.01 mL/min; solvent composition in the D1 Hypercarb column is 100% decane; flow rate for the SEC column is 2.51 mL/min at room temperature; solvent composition in the D2 PLgel column is 100% TCB; solvent composition in the D2 SEC column does not change throughout the separation.

A 311-µL aliquot of sample solution is injected into the HTLC column. The injection triggers the gradient described below:
from 0-10 min, 100% decane/0% TCB;
from 10-651 min, TCB is increased linearly from 0% TCB to 80% TCB.

The injection also triggers the collection of the light scattering signal at 15° angle (LS15) and the "measure" and "methyl" signals from IR5 detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min. Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC:

The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$$X_n = \text{elution volume (mL)} = D1 \text{ flow rate} \times n \times t_{switch}$$

where $t_{switch}=3$ min is the switch time of the 10-port VICI valve $$Y_n = \text{signal intensity (Voltage)} = \sum_{peak\ start}^{peak\ end} IR_{measure,n}.$$

The above equation uses $IR_{measure}$ signal as the example. The obtained HTLC chromatogram shows the concentrations of the separated polymeric components as a function of elution volume.

X-Y pairs of data are also obtained from $IR_{methyl}$ and LS15 signals. The ratio of $IR_{methyl}/IR_{measure}$ is used to calculate composition after calibration. The ratio of LS15/$IR_{measure}$ is used to calculate weight-average molecular weight ($M_w$) after calibration.

Calibration follows the procedures of Lee et al. HDPE, isotactic polypropylene (iPP), and ethylene/propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, Ω, is determined from the total LS15 signals ($A_{LS15}$) and the total $IR_{measure}$ signals ($A_{IR,measure}$):

$$\Omega = \frac{A_{LS15}}{A_{IR,measure} M_w}$$

The experimental LS15/$IR_{measure}$ ratio is then converted to $M_w$ through Ω.

$C^{13}$ Nuclear Magnetic Resonance (NMR)

Sample Preparation: samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters: data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non-spinning samples in locked mode. Samples are homogenized immediately prior to insertion into the heated (130° C.) NMR Sample changer, and are allowed to thermally equilibrate in the probe for 15 minutes prior to data acquisition. The NMR may be used to determine total weight percent of ethylene, e.g., with respect to the crystalline block composite index or block composite index discussed below.

Xylene Soluble Fractionation Analysis

A weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed.

DETAILED DESCRIPTION

The present disclosure provides a plastic living hinge. The plastic living hinge includes a blend containing (A) an ethylene-based polymer and (B) a composite component selected from a block composite, a crystalline block composite, and a combination thereof.

A "plastic living hinge" is a structure composed of one or more polymeric materials, the structure having a first body and a second body connected to each other by a continuous thinner fulcrum section, the fulcrum section enabling the first body to bend, or otherwise to pivot, with respect to the second body. Nonlimiting examples of suitable plastic living hinges include straight living hinges, flat living hinges, biased/unbiased dual strap hinge closures, butterfly living hinges, piano hinges, double living hinges, and triple living hinges.

Figure 1B:
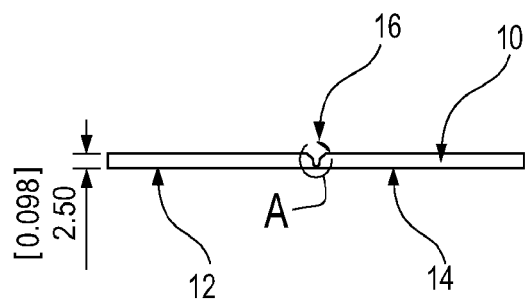
FIG. 1B is a front elevation view of the plastic living hinge of FIG. 1A.
Figure 1C:
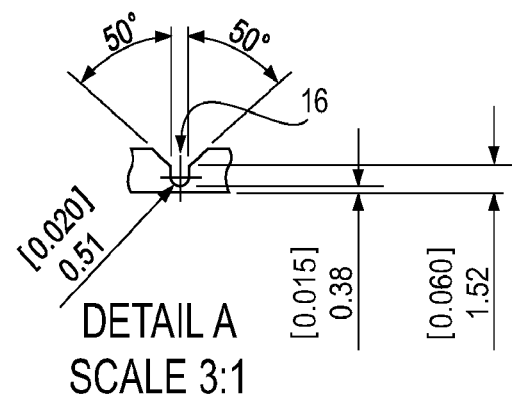
FIG. 1C is an enlarged view of area A of FIG. 1B.

In an embodiment, FIGS. 1A, 1B, and 1C show a plastic living hinge 10 having a first body 12 and a second body 14. A fulcrum 16 connects the first body 12 to the second body 14. The fulcrum 16 is thinner than the first body 12 and the fulcrum 16 is thinner than the second body 14. The fulcrum 16 enables the first body 12 to bend with respect to the second body 14. The plastic living hinge 10 is an integral component—the first body 12, the second body 14, and the fulcrum 16 produced simultaneously, or substantially simultaneously, in a single mold process.

The plastic living hinge 10 (and each component thereof) is composed of the blend of (A) ethylene-based polymer and (B) composite component selected from a block composite, a crystalline block composite, or a combination thereof, as will be described in detail below.

(A) Ethylene-Based Polymer

The blend of the plastic living hinge contains an ethylene-based polymer. The ethylene-based polymer may be any ethylene-based polymer disclosed herein, and combinations thereof. A nonlimiting example of a suitable ethylene-based polymer is high density polyethylene (HDPE). The HDPE may be an ethylene homopolymer or an ethylene interpolymer. In an embodiment, the HDPE is an ethylene/α-olefin interpolymer or an ethylene/α-olefin copolymer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene-based polymer does not contain an aromatic comonomer polymerized therein. In an embodiment, the ethylene-based polymer is an ethylene/1-hexene interpolymer.

In an embodiment, the ethylene-based polymer contains greater than 50 wt % units derived from ethylene, or from 51 wt %, or 55 wt %, or 60 wt % to 70 wt %, or 80 wt %, or 90 wt %, or 95 wt %, or 99 wt %, or 100 wt % units derived from ethylene, based on the weight of the ethylene-based polymer. In an embodiment, the ethylene-based polymer contains a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the ethylene-based polymer.

In an embodiment, the ethylene-based polymer is a HDPE that is an ethylene/α-olefin copolymer. In an embodiment, the ethylene/α-olefin copolymer consists of units derived from ethylene and a $C_3$-$C_{10}$ α-olefin comonomer, or a $C_4$-$C_8$ α-olefin comonomer, or a $C_6$-$C_8$ α-olefin comonomer, or 1-hexene, and optional additives. In an embodiment, the HDPE is an ethylene/$C_4$-$C_8$ α-olefin copolymer having one, some, or all of the following properties: (a) a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc; and/or (b) a melt index (I2) from 0.5 g/10 min, or 1 g/10 min, or 5 g/10 min, or 8 g/10 min, or 10 g/10 min, or 15 g/10 min, or 20 g/10 min, or 25 g/10 min, or 30 g/10 min, or 35 g/10 min, or 40 g/10 min to 45 g/10 min, or 50 g/10 min, or 55 g/10 min, or 60 g/10 min; and/or (c) a melting point (Tm) from 110° C., or 115° C., or 120° C., or 125° C. to 128° C., or 130° C., or 135° C., or 140° C., or 145° C., or 150° C., or 155° C., or 160° C., or 165° C., or 170° C., or 175° C., or 180° C.

The blend may contain more than one ethylene-based polymer. In an embodiment, the blend includes at least two ethylene-based polymers, wherein each ethylene-based polymer differs from one another compositionally, structurally, and/or physically.

In an embodiment, the blend contains from 60 wt %, or 65 wt %, or 70 wt % to 80 wt %, or 85 wt %, or 90 wt %, or 95 wt % ethylene-based polymer, based on the total weight of the blend.

The ethylene-based polymer may comprise two or more embodiments discussed herein.

(B) Composite Component

The blend of the plastic living hinge contains a composite component selected from (1) a block composite, (2) a crystalline block composite, or (3) a combination thereof.

1. Block Composite

In an embodiment, the blend of the plastic living hinge includes a block composite. The term "block composite" ("BC") refers to polymers containing three components:

(i) an ethylene based polymer (EP) having an ethylene content of from 10 mol % to less than 90 mol % (a soft copolymer);

(ii) an alpha-olefin based polymer (AOP) having an alpha-olefin content of greater than 90 mol % (a hard copolymer); and (iii) a block copolymer having an ethylene block (EB) and an alpha-olefin block (AOB); wherein the ethylene block (soft block/soft segment) of the block copolymer is the same composition as the ethylene based polymer of component (i) of the block composite and the alpha-olefin block (hard block/hard segment) of the block copolymer is the same composition as the alpha-olefin based polymer of component (ii) of the block composite. The compositional split between the amount of ethylene based polymer and alpha-olefin based polymer will be essentially the same as that between the corresponding blocks in the block copolymer. In certain embodiments, the $\alpha$-olefin is propylene. In further embodiments, the AOB and EB may be an iPP-EP diblock copolymer.

"Hard" blocks (also referred to as hard segments) refer to highly crystalline blocks of polymerized units in which a monomer (e.g., propylene) is present in an amount greater than or equal to 90 mol %. In other words, the comonomer content (e.g., ethylene content) in the hard blocks/segments is less than or equal to 10 mol %. In some embodiments, the hard segments comprise all or substantially all propylene units (such as an iPP—isotactic polypropylene—copolymer or homopolymer block). "Soft" blocks (also referred to as soft segments), on the other hand, refer to amorphous, substantially amorphous, or elastomeric blocks of polymerized units in which a monomer (e.g., ethylene) is present in an amount from 10 mol % to less than 90 mol %. In other words, the comonomer content (e.g., propylene content) in the soft blocks/segments is greater than 10 mol %.

In an embodiment, the BC has a total ethylene content that is from 25 wt %, or 30 wt % to 50 wt %, or 55 wt %, or 60 wt %, or 70 wt %, based on the total weight of the BC. The remainder of the total weight of the BC may be accounted for by units derived from at least one $C_{3-10}$ $\alpha$-olefin, such as propylene.

In an embodiment, the BC includes (i) a soft copolymer having an ethylene content that is from 10 mol % to less than 90 mol %, (ii) a hard copolymer having a propylene content that is greater than or equal to 90 mol %, and (iii) a block copolymer (e.g., a diblock) having a soft block (i.e., soft segment) and a hard block (i.e., hard segment), wherein the hard block of the block copolymer is the same composition as the hard copolymer of the block composite and the soft block of the block copolymer is the same composition as the soft copolymer of the block composite. The compositional split between the amount of soft copolymer and hard copolymer will be essentially the same as that between the corresponding blocks in the block copolymer.

In an embodiment, the BC includes (i) a soft copolymer having an ethylene content that is greater than 10 wt % and less than 86 wt %, (ii) a hard copolymer having a propylene content that is greater than 80 wt % and up to 100 wt %, and (iii) a block copolymer (e.g., a diblock) having a soft block (i.e., soft segment) and a hard block (i.e., hard segment), wherein the hard block of the block copolymer is the same composition as the hard copolymer of the BC and the soft block of the block copolymer is the same composition as the soft copolymer of the BC. The compositional split between the amount of soft copolymer and hard copolymer will be essentially the same as that between the corresponding blocks in the block copolymer.

In the BC, the hard blocks refer to highly crystalline blocks of polymerized $\alpha$-olefin units (e.g., propylene). In the hard blocks, the monomer (i.e., propylene) may be present in an amount greater than 80 wt % (e.g., greater than 85 wt %, greater than 90 wt %, and/or greater than 95 wt %), based on the weight of the hard block. The remainder of the hard block may be the comonomer (e.g., ethylene) in an amount of less than 20 wt % (e.g., less than 15 wt % and/or less than 10 wt %), based on the weight of the hard block. In an embodiment, the hard blocks comprise all or substantially all propylene units, such as an iPP (isotactic) homopolymer block or an iPP copolymer block with less than 10 wt % of ethylene. The soft blocks refer to amorphous, substantially amorphous, or elastomer blocks of polymerized ethylene units. In the soft blocks, the monomer (i.e., ethylene) may be present in an amount of greater than 20 wt % and less than 90 wt % (e.g., from 40 wt % to 89 wt %, from 45 wt % to 85 wt %, and/or from 50 wt % to 80 wt %), based on the weight of the soft block. The remainder of the soft block may be the comonomer (e.g., propylene).

In an embodiment, the block composite includes a block copolymer having 30-70 wt % hard block and 30-70 wt % soft block. In other words, the block composite includes a block copolymer having 30-70 wt % hard block and 30-70 wt % soft block, based on the total weight of the block copolymer.

In an embodiment, the block copolymer of the BC has the formula (EP)-(iPP), in which EP represents the soft block of polymerized ethylene and propylene monomeric units (e.g., 50-80 wt % of ethylene and remainder propylene) and iPP represents a hard block of isotactic propylene homopolymer or isotactic propylene copolymer (e.g., less than 10 wt % of ethylene and remainder propylene).

An exemplary measurement of the relative amount of the block copolymer is referred to as the Block Composite Index (BCI), as further discussed below. The BCI for the BC is greater than 0 and less than 1.0. In an embodiment, the BC has a Block Composite Index (BCI) from greater than zero, or 0.1, or 0.2, or 0.3 to 0.4, or 0.5, or 0.6, or 0.7, or 0.8, or 0.9, or 1.0. In another embodiment, the BC has a BCI from greater than zero to 0.4, or from 0.1 to 0.3, or 0.4. In another embodiment, the BC has a BCI from greater than 0.4 to 1.0, or from 0.4, or 0.5, or 0.6 to 0.7, or 0.9, or 1.0. In another embodiment, the BC has a BCI from 0.7, or 0.8, or 0.9 to 1.0.

In an embodiment, the BC has a microstructure index greater than 1 and equal to or less than 20. The microstructure index is an estimation using solvent gradient interaction chromatography (SGIC) separation to differentiate block copolymers from random copolymers. In particular, microstructure index estimation relies on differentiating between two fractions, i.e., a higher random copolymer content fraction and a higher block copolymer content fraction, of which the random copolymer and the block copolymer have essentially the same chemical composition. The early eluting fraction (i.e., the first fraction) correlates to random copolymers and the late eluting component (i.e., the second fraction) correlates to block copolymers. The calculation of the microstructure index is discussed below.

In an embodiment, the BC has a weight average molecular weight (Mw) from 10,000 g/mol, or 35,000 g/mol, or 50,000 g/mol, or 80,000 g/mol to 200,000 g/mol, or 300,000 g/mol, or 500,000 g/mol, or 1,000,000 g/mol, or 2,500.00 g/mol. In an embodiment, the molecular weight distribution (Mw/Mn) or polydispersity of the BC is less than 5, or from 1, or 1.5 to 4, or 5.

In an embodiment, the melt flow rate (MFR) of the BC is from 0.1 g/10 min, or 3 g/10 min to 10 g/10 min, or 15 g/10 min, or 20 g/10 min, or 60 g/10 min, or 100 g/10 min, or 1,000 g/10 min.

In an embodiment, the density of the BC is from 0.850 g/cc, or 0.860 g/cc, or 0.865 g/cc to 0.890 g/cc, or 0.895 g/cc, or 0.900 g/cc, or 0.910 g/cc, or 0.920 g/cc.

In an embodiment, the BC has a second peak Tm of greater than 35° C., or greater than 90° C., or greater than 100° C., or from 40° C., or 100° C. to 150° C.

In an embodiment, the BC contains: (i) from 0.5 wt %, or 10 wt %, or 20 wt %, or 30 wt % to 40 wt %, or 50 wt %, or 60 wt %, or 70 wt %, or 79 wt %, or 95 wt % EP; (ii) from 0.5 wt %, or 10 wt %, or 20 wt %, or 30 wt % to 40 wt %, or 50 wt %, or 60 wt %, or 70 wt %, or 79 wt %, or 95 wt % AOP; and (iii) from 5 wt %, or 50 wt % to 99 wt % block copolymer, based on total weight of the BC.

The sum of the weight percents of EP, AOP and block copolymer equals 100%.

In an embodiment, the block copolymer of the BC contains from 5 wt %, or 10 wt %, or 25 wt %, or 30 wt % to 70 wt %, or 75 wt %, or 90 wt %, or 95 wt % ethylene blocks (EB); and from 95 wt %, or 90 wt %, or 75 wt %, or 70 wt % to 30 wt %, or 25 wt %, or 10 wt %, or 5 wt % alpha-olefin blocks (AOB).

In an embodiment, the BC contains:

(i) from 0.5 wt %, or 10 wt %, or 20 wt %, or 30 wt % to 40 wt %, or 50 wt %, or 60 wt %, or 70 wt %, or 79 wt %, or 95 wt % EP;

(ii) from 0.5 wt %, or 10 wt %, or 20 wt %, or 30 wt % to 40 wt %, or 50 wt %, or 60 wt %, or 70 wt %, or 79 wt %, or 95 wt % iPP; and (iii) from 5 wt %, or 10 wt %, or 25 wt %, or 30 wt % or 50 wt % to 70 wt %, or 80 wt %, or 90 wt %, or 95 wt %, or 99 wt % block copolymer, based on total weight of the BC; and the block composite has one, some, or all of the following properties:

(a) the EP contains from 50 wt %, or 55 wt %, or 60 wt % to 65 wt %, or 70 wt %, or 75 wt %, or 80 wt % ethylene and a reciprocal amount of propylene, or from 20 wt %, or 25 wt %, or 30 wt %, or 35 wt % to 40 wt %, or 45 wt %, or 50 wt % propylene, based on the total weight of the EP; and/or (b) the EP contains from 10 mol %, or 20 mol %, or 30 mol %, or 40 mol %, or 50 mol %, or 60 mol %, or 65 mol %, or 70 mol %, or 73 mol % to 75 mol %, or 80 mol %, or 85 mol %, or 89 mol % polymerized ethylene units and a reciprocal amount of polymerized propylene units, or from 11 mol %, or 15 mol %, or 20 mol %, or 25 mol % to 27 mol %, or 30 mol %, or 35 mol %, or 40 mol %, or 50 mol %, or 60 mol %, or 70 mol %, or 80 mol %, or 90 mol % polymerized propylene units, based on the total number of moles of the EP; and/or (c) the iPP contains from 100 wt %, or 99.5 wt %, or 99 wt % to 95 wt %, or 90 wt %, or 85 wt %, or 80 wt %, or 75 wt %, or 70 wt %, or 65 wt %, or 60 wt %, or 55 wt % propylene and a reciprocal amount of ethylene, or from 0 wt %, or 0.5 wt % to 1 wt %, or 5 wt %, or 10 wt %, or 15 wt %, or 20 wt %, or 25 wt %, or 30 wt %, or 35 wt %, or 40 wt %, or 45 wt % ethylene, based on the total weight of the iPP; and/or (d) the iPP contains from 90 mol %, or 91 mol %, or 92 mol %, or 93 mol %, or 94 mol %, or 95 mol %, or 96 mol %, or 97 mol %, or 98 mol % to 99 mol % polymerized propylene units and a reciprocal amount of polymerized ethylene units, or from 1 mol % to 2 mol %, or 3 mol %, or 4 mol %, or 5 mol %, or 6 mol %, or 7 mol %, or 8 mol %, or 9 mol %, or 10 mol % polymerized ethylene units, based on the total number of moles of the iPP; and/or (e) the block copolymer contains from 5 wt %, or 10 wt %, or 25 wt %, or 30 wt % to 70 wt %, or 75 wt %, or 90 wt %, or 95 wt % EB and a reciprocal amount, or from 95 wt %, or 90 wt %, or 75 wt %, or 70 wt % to 30 wt %, or 25 wt %, or 10 wt %, or 5 wt % iPP blocks, based on the total weight of the block copolymer; and/or (f) a BCI from 0.1, or 0.2, or 0.3, or 0.4 to 0.5, or 0.6, or 0.7, or 0.8, or 0.9, or 1.0; and/or (g) a melt flow rate (MFR) from 0.1 g/10 min, or 5 g/10 min, or 10 g/10 min, or 15 g/10 min, or 18 g/10 min to 20 g/10 min, or 30 g/10 min, or 50 g/10 min, or 1000 g/10 min; and/or (h) a weight average molecular weight (Mw) from 50,000 g/mol, or 80,000 g/mol, or 100,000 g/mol to 150,000 g/mol, or 200,000 g/mol, or 300,000 g/mol, or 500,000 g/mol, or 1,000,000 g/mol; and/or (i) a Mw/Mn from 1.0, or 1.5, or 2.0, or 2.5, or 3.0, or 3.5, or 3.7 to 3.8, or 4.0, or 4.5, or 5.0; and/or (h) a heat of fusion (or melt enthalpy) from 20 Joules per gram (J/g), or 25 J/g, or 30 J/g, or 35 J/g, or 50 J/g, or 60 J/g, or 70 J/g, or 75 J/g, or 80 J/g to 85 J/g, or 90 J/g, or 95 J/g, or 100 J/g, or 125 J/g; and/or (j) a crystallization temperature, Tc, from 70° C., or 75° C., or 80° C., or 85° C. to 90° C., or 95° C., or 100° C.; and/or (k) a first peak Tm from 100° C., or 110° C., or 120° C., or 130° C., or 135° C. to 138° C., or 140° C., or 145° C., or 150° C.; and/or (l) a second peak Tm from 35° C., or 40° C. to 45° C., or 50° C., or 60° C.; and/or (m) a total ethylene content from 20 wt %, or 25 wt %, or 30 wt %, or 33 wt % to 35 wt %, or 40 wt %, or 45 wt %, or 50 wt %, based on the total weight of the BC.

2. Crystalline Block Composite

In an embodiment, the blend of the plastic living hinge includes a crystalline block composite. The term "crystalline block composite" ("CBC") refers to polymers containing three components:

(i) a crystalline ethylene based polymer (CEP) (also referred to herein as a soft polymer);

(ii) a crystalline alpha-olefin based polymer (CAOP) (also referred to herein as a hard polymer); and (iii) a block copolymer comprising a crystalline ethylene block (CEB) and a crystalline alpha-olefin block (CAOB); wherein the CEB of the block copolymer is the same composition as the CEP of component (i) of the block composite and the CAOB of the block copolymer is the same composition as the CAOP of component (ii) of the block composite. Additionally, the compositional split between the amount of CEP and CAOP will be essentially the same as that between the corresponding blocks in the block copolymer. When produced in a continuous process, the CBC has a polydispersity index (PDI) from 1.7, or 1.8 to 3.5, or 5, or 10, or 15. Such CBC is described in, for example, US Patent Application Publication Nos. 2011/0313106, 2011/0313108 and 2011/0313108, all published on 22 Dec. 2011, and in PCT Publication No. WO2014/043522A 1, published 20 Mar. 2014, each of which are incorporated herein by reference with respect to descriptions of CBC, processes to make CBC, and methods of analyzing CBC.

The crystalline ethylene based polymer (CEP) contains least 90 mol % polymerized ethylene units in which any comonomer content is 10 mol % or less, or from 0 mol % to 5 mol %, or 7 mol %, or 10 mol %. The crystalline ethylene based polymer has corresponding melting points that are 75° C. and above, or 90° C. and above, or 100° C. and above.

The crystalline alpha-olefin based polymer (CAOP) is a highly crystalline polymer containing polymerized α-olefin units in which the monomer (e.g., propylene) is present in an amount greater than 90 mol %, or greater than 93 mol %, or greater than 95 mol %, or greater than 98 mol %, based on the total weight of the crystalline α-olefin based polymer (propylene). In an embodiment, the polymerized α-olefin unit is polypropylene. The comonomer (e.g., ethylene) content in the CAOP is less than 10 mol %, or less than 7 mol %, or less than 5 mol %, or less than 2 mol %. CAOPs with propylene crystallinity have corresponding melting points that are 80° C. and above, or 100° C. and above, or 115° C. and above, or 120° C. and above. In an embodiment, the CAOP comprises all, or substantially all, propylene units.

Nonlimiting examples of other suitable α-olefin units (in addition to propylene) that may be used in the CAOP are those that contain 4 to 10 carbon atoms, such as 1-butene, 1-hexene, 4-methyl-1-pentene and 1-octene. Nonlimiting examples of suitable diolefins include isoprene, butadiene, 1,4-pentadiene, 1,4-hexadiene, 1,5-hexadiene, 1,7-octadiene, 1, 9-decadiene, dicyclopentadiene, methylene-norbornene, 5-ethylidene-2-norbornene, or the like, and combinations containing at least one of the foregoing α-olefin units.

The block copolymer of the CBC contains an ethylene block (e.g., a crystalline ethylene block (CEB)) and a crystalline alpha olefin block (CAOB). In the crystalline ethylene block (CEB), ethylene monomer is present in an amount greater than 90 mol %, or greater than 93 mol %, or greater than 95 mol %, or greater than 90 mol %, based on the total number of moles of the CEB. In an embodiment, the crystalline ethylene block (CEB) polymer is polyethylene. The polyethylene is present in an amount greater than 90 mol %, or greater than 93 mol %, or greater than 95 mol %, based on the total number of moles of the CEB. If any comonomer is present in the CEB, it is present in an amount of less than 10 mol %, or less than 5 mol %, based on the total number of moles of the CEB.

The CAOB includes a polypropylene block that is copolymerized with other α-olefin units that contain 4 to 10 carbon atoms. Nonlimiting examples of suitable α-olefins are provided above. The polypropylene is present in the CAOB in an amount of greater than or equal to 90 mol %, or greater than 93 mol %, or greater than 95 mol %, based on the total number of moles of the CAOB. The comonomer content in the CAOB is less than 10 mol %, or less than 7 mol %, or less than 5 mol percent, based on the total number of moles in the CAOB. A CAOB with propylene crystallinity has a corresponding melting point that is 80° C. and above, or 100° C. and above, or 115° C. and above, or 120° C. and above. In an embodiment, the CAOB comprises all, or substantially all, propylene units.

In an embodiment, the CBC contains propylene, 1-butene or 4-methyl-1-pentene and one or more comonomers. In a further embodiment, the CBC contains, in polymerized form, propylene and ethylene and/or one or more $C_{4-20}$ α-olefin comonomers, and/or one or more additional copolymerizable comonomers, or the CBC contains 4-methyl-1-pentene and ethylene and/or one or more $C_{4-20}$ α-olefin comonomers, or the CBC contains 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. In an embodiment, the monomer is propylene and the comonomer is ethylene.

Comonomer content in the CBC may be measured using any suitable technique, such as techniques based on nuclear magnetic resonance (NMR) spectroscopy.

In an embodiment, the CBC has a melting point Tm greater than 100° C., or greater than 120° C., or greater than 125° C. In an embodiment, the Tm is in the range of from 100° C., or 120° C., or 125° C. to 220° C., or 250° C. In an embodiment, the CBC has a melt flow rate (MFR) from 0.1 g/10 min to 30 g/10 min, or 50 g/10 min, or 1000 g/10 min.

In an embodiment, the CBC has a weight average molecular weight (Mw) from 10,000 g/mol, or 35,000 g/mol, or 50,000 g/mol to 200,000 g/mol, or 300,000 g/mol, or 1,000,000 g/mol, or 2,500,000 g/mole.

In an embodiment, the CBC has a Crystalline Block Composite Index (CBCI) from greater than zero, or 0.1, or 0.2, or 0.3 to 0.4, or 0.5, or 0.6, or 0.7, or 0.8, or 0.9, or 1.0. In another embodiment, the BC has a BCI from greater than zero to 0.4, or from 0.1 to 0.3, or 0.4. In another embodiment, the CBC has a CBCI from greater than 0.4 to 1.0, or from 0.4, or 0.5, or 0.6 to 0.7, or 0.9, or 1.0. In another embodiment, the CBC has a CBCI from 0.7, or 0.8, or 0.9 to 1.0.

In an embodiment, the CBC contains (i) from 0.5 wt % to 79 wt %, or 95 wt % CEP; (ii) from 0.5 wt % to 79 wt %, or 95 wt % CAOP; and (iii) from 5 wt %, or 50 wt % to 99 wt % block copolymer, based on total weight of crystalline block composite.

The sum of the weight percents of CEP, CAOP and block copolymer equals 100%

In an embodiment, the block copolymer of the CBC contains from 5 wt %, or 10 wt %, or 25 wt %, or 30 wt % to 70 wt %, or 75 wt %, or 90 wt %, or 95 wt % crystalline ethylene blocks (CEB); and from 95 wt %, or 90 wt %, or 75 wt %, or 70 wt % to 30 wt %, or 25 wt %, or 10 wt %, or 5 wt % crystalline alpha-olefin blocks (CAOB).

In an embodiment, the CBC contains (i) a CEP that is a crystalline ethylene/propylene copolymer (CEP); (ii) a CAOP that is an isotactic crystalline propylene homopolymer (iPP); and (iii) a block copolymer containing an iPP block (CAOB) and an EP block (CEB); wherein the block copolymer includes a diblock with the Formula (2): (CEP)-(iPP) Formula (2).

In an embodiment, the CBC contains:

(i) from 0.5 wt %, or 10 wt %, or 20 wt %, or 30 wt % to 40 wt %, or 50 wt %, or 60 wt %, or 70 wt %, or 79 wt %, or 95 wt % CEP;

(ii) from 0.5 wt %, or 10 wt %, or 20 wt %, or 30 wt % to 40 wt %, or 50 wt %, or 60 wt %, or 70 wt %, or 79 wt %, or 95 wt % iPP; and (iii) from 5 wt %, or 10 wt %, or 25 wt %, or 30 wt % or 50 wt % to 70 wt %, or 80 wt %, or 90 wt %, or 95 wt %, or 99 wt % block copolymer, based on total weight of the CBC; and the crystalline block composite has one, some, or all of the following properties:

(a) the CEP contains from 85 wt %, or 89 wt % to 92 wt %, or 95 wt %, or 99 wt % ethylene and a reciprocal amount of propylene, or from 1 wt %, or 5 wt %, or 8 wt % to 11 wt %, or 15 wt % propylene, based on the total weight of the CEP; and/or (b) the CEP contains from 90 mol %, or 91 mol %, or 92 mol % to 95 mol %, or 96 mol %, or 97 mol %, or 98 mol %, or 99 mol % polymerized ethylene units and a reciprocal amount of polymerized propylene units, or from 1 mol %, or 2 mol %, or 3 mol %, or 4 mol %, or 5 mol % to 8 mol %, or 9 mol %, or 10 mol % polymerized propylene units, based on the total number of moles of the CEP; and/or (c) the iPP contains from 100 wt %, or 99.5 wt %, or 99 wt % to 95 wt %, or 90 wt %, or 85 wt %, or 80 wt %, or 75 wt %, or 70 wt %, or 65 wt %, or 60 wt %, or 55 wt % propylene and a reciprocal amount of ethylene, or from 0 wt %, or 0.5 wt % to 1 wt %, or 5 wt %, or 10 wt %, or 15 wt %, or 20 wt %, or 25 wt %, or 30 wt %, or 35 wt %, or 40 wt %, or 45 wt % ethylene, based on the total weight of the iPP; and/or (d) the iPP contains from 90 mol %, or 91 mol %, or 92 mol %, or 93 mol %, or 94 mol %, or 95 mol %, or 96 mol %, or 97 mol %, or 98 mol % to 99 mol % polymerized propylene units and a reciprocal amount of polymerized ethylene units, or from 1 mol % to 2 mol %, or 3 mol %, or 4 mol %, or 5 mol %, or 6 mol %, or 7 mol %, or 8 mol %, or 9 mol %, or 10 mol % polymerized ethylene units, based on the total number of moles of the iPP; and/or (e) the block copolymer contains from 5 wt %, or 10 wt %, or 25 wt %, or 30 wt % to 50 wt %, or 70 wt %, or 75 wt %, or 90 wt %, or 95 wt % EB and a reciprocal amount, or from 95 wt %, or 90 wt %, or 75 wt %, or 70 wt %, or 50 wt % to 30 wt %, or 25 wt %, or 10 wt %, or 5 wt % iPP blocks, based on the total weight of the block copolymer; and/or (f) a CBCI from 0.1, or 0.2, or 0.3, or 0.4, or 0.5, or 0.6 to 0.7, or 0.8, or 0.9, or 1.0; and/or (g) a melt flow rate (MFR) from 0.1 g/10 min, or 5 g/10 min, or 10 g/10 min, or 15 g/10 min, or 20 g/10 min, or 23 g/10 min to 40 g/10 min, or 50 g/10 min, or 1000 g/10 min; and/or (h) a weight average molecular weight (Mw) from 50,000 g/mol, or 70,000 g/mol, or 80,000 g/mol, or 100,000 g/mol to 130,000 g/mol, or 150,000 g/mol, or 200,000 g/mol, or 300,000 g/mol, or 500,000 g/mol, or 1,000,000 g/mol; and/or (i) a Mw/Mn from 1.0, or 1.5, or 2.0, or 2.5, or 3.0, or 3.5, or 3.7, or 3.8, or 4.0 to 4.3, or 4.5, or 5.0; and/or (j) a heat of fusion (or melt enthalpy) from 20 J/g, or 25 J/g, or 30 J/g, or 35 J/g, or 50 J/g, or 60 J/g, or 70 J/g, or 75 J/g, or 80 J/g, or 85 J/g, or 90 J/g, or 92 J/g to 100 J/g, or 110 J/g, or 115 J/g, or 125 J/g; and/or (k) a crystallization temperature, Tc, from 70° C., or 75° C., or 80° C., or 85° C., or 90° C. to 95° C., or 100° C.; and/or (l) a first peak Tm from 100° C., or 110° C., or 120° C., or 130° C. to 136° C., or 140° C., or 145° C., or 150° C.; and/or (m) a second peak Tm from 90° C., or 95° C., or 100° C., or 103° C. to 105° C., or 110° C., or 115° C., or 120° C., or 125° C., or 130° C., or 140° C., or 150° C.; and/or (n) a total ethylene content from 20 wt %, or 25 wt %, or 28 wt % to 47 wt %, or 50 wt %, or 55 wt %, or 60 wt %, or 70 wt %, based on the total weight of the CBC.

It is understood that the sum of the components in each of the composite components and blends disclosed herein, including the foregoing composite components, yields 100 wt %.

It is understood that the sum of the components in each of the polymers disclosed herein, including the foregoing polymers, yields 100 mol %.

3. Polymerization of Block Composite and Crystalline Block Composite

The CBC and BC (collectively, "the composite component") may be differentiated from conventional, random copolymers, physical blends of polymers, and block copolymers prepared via sequential monomer addition. The composite component may be differentiated from random copolymers by characteristics such as higher melting temperatures for a comparable amount of comonomer, CBCI and BCI; from a physical blend by characteristics such as CBCI BCI, better tensile strength, improved fracture strength, finer morphology, improved optics, and/or greater impact strength at lower temperature; and from block copolymers prepared by sequential monomer addition by molecular weight distribution, rheology, shear thinning, rheology ratio, and in that there is block polydispersity. For example, the composite component includes a block copolymer having distinct regions or segments (referred to as "blocks") joined in a linear manner. The blocks differ, e.g., in the type of crystallinity such as polyethylene (PE) versus polypropylene (PP). The block copolymers can be linear or branched. When produced in a continuous process, the composite component has a PDI from 1.7, or 1.8 to 3.5, or 5, or 10 15. When produced in a batch or semi-batch process, the composite component has a PDI from 1.0, or 1.3, or 1.4 to 1.8, or 2.0, or 2.5, or 2.9.

The composite component includes the block copolymer possessing a most probable distribution of block lengths. The block copolymer contains 2 or 3 blocks or segments. In a process for making the polymers of the composite component, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The composite component may be prepared, e.g., by a process comprising contacting an addition polymerizable monomer or mixture of monomers under addition polymerization conditions with a composition comprising at least one addition polymerization catalyst, a cocatalyst, and a chain shuttling agent. The process is characterized by formation of at least some of the growing polymer chains under differentiated process conditions in two or more reactors operating under steady state polymerization conditions or in two or more zones of a reactor operating under plug flow polymerization conditions.

Suitable processes useful in producing the composite component may be found in, e.g. example, U.S. Pat. Nos. 8,053,529, 8,686,087, and 8,716,400. The polymerization may be carried out as a continuous polymerization, e.g., a continuous-solution polymerization, in which catalyst components, monomers, and optionally solvent, adjuvants, scavengers, and/or polymerization aids are continuously supplied to one or more reactors or zones and polymer product continuously removed therefrom. Within the scope of the terms "continuous" and "continuously," as used in this context, are those processes in which there are intermittent additions of reactants and removal of products at small regular or irregular intervals, so that, over time, the overall process is substantially continuous. Further, a chain shuttling agent(s) may be added at any point during the polymerization including in a first reactor or zone, at the exit or slightly before the exit of the first reactor, between the first reactor or zone and a second or any subsequent reactor or zone, or even solely to the second or any subsequent reactor or zone. Exemplary chain shuttling agents, catalysts, and cocatalysts are those disclosed in, e.g., U.S. Pat. No. 7,951,882 and WO 2011/016991 A 2. For example, chain shuttling agents that are dialkyl zinc compounds may be used.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

Due to the difference in monomers, temperatures, pressures, or other differences in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes. Each reactor in the series can be operated under high pressure, solution, slurry, or gas phase polymerization conditions.

In the following exemplary processes, continuous or substantially continuous polymerization conditions may be employed. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. A high pressure process may be carried out at temperatures from 100° C. to 400° C. and at pressures above 500 bar (50 MPa). A slurry process may use an inert hydrocarbon diluent and temperatures of from 0° C. up to a temperature just below the temperature at which the resulting polymer becomes substantially soluble in the inert polymerization medium. Exemplary temperatures in a slurry polymerization are from 30° C. and pressures may range from atmospheric (100 kPa) to 500 psi (3.4 MPa).

Without limiting in any way the scope of the embodiments, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Exemplary solvents include $C_{4-10}$ hydrocarbons or mixtures thereof, especially alkanes such as hexane or mixtures of alkanes, as well as one or more of the monomers employed in the polymerization. Catalyst along with cocatalyst and optionally chain shuttling agent are continuously or intermittently introduced in the reactor liquid phase or any recycled portion thereof at a minimum of one location.

The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. For example, use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent. The resulting polymer product is recovered by flashing off volatile components of the reaction mixture such as residual monomers or diluent at reduced pressure, and, if necessary, conducting further devolatilization in equipment such as a devolatilizing extruder.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

The BC and the CBC may comprise two or more embodiments discussed herein.

In an embodiment, the blend contains from 5 wt %, or 10 wt %, or 15 wt %, or 20 wt % to 30 wt %, or 35 wt %, or 40 wt % composite component (e.g., BC or CBC), based on the total weight of the blend.

The composite component may comprise two or more embodiments discussed herein.

(C) Optional Additive(s)

In an embodiment, the blend contains one or more additives. Nonlimiting examples of suitable additives include filler (e.g., glass spheres, calcium carbonate, post-consumer recycle, glass fibers, talc, or any other organic or inorganic filler, or combinations thereof), processing aids, acid neutralizers, UV stabilizers, hydro peroxide decomposers, alkyl radical scavengers, hindered amine stabilizers, multifunctional stabilizers, phosphites, antioxidants, process stabilizers, metal de-activators, additives to improve oxidative or chlorine resistance, pigments, colorants, slip agents, nucleating agents (e.g., metal salts of hexahydrophthalic acid), fatty acid stearates, fluoroelastomers, antistatic additives, and organic or inorganic performance enhancing additives, or combinations thereof.

In an embodiment, the blend contains from 0.0001 wt %, or 0.001 wt %, or 0.01 wt %, or 0.1 wt % to 0.5 wt %, or 0.8 wt %, or 0.9 wt %, or 1.0 wt %, or 2 wt % additive, based on the total weight of the blend.

In an embodiment, the blend excludes an additive (e.g., a filler).

The additive may comprise two or more embodiments discussed herein.

Plastic Living Hinge

The present disclosure provides a plastic living hinge. The plastic living hinge contains a blend. The blend contains (A) an ethylene-based polymer; and (B) a composite component selected from a BC, a CBC, and combinations thereof; and, optionally, (C) an additive.

In an embodiment, the blend has an IDI load at peak at −20° C. from 3100 N, or 3200 N, or 3300 N to 3400 N, or 3500 N, or 3600 N, or 3700 N, or 3800 N. A higher IDI load at peak at −20° C. is advantageous because it indicates the material may withstand greater impact force prior to failure. In an embodiment, the blend has an IDI total energy dissipation at −20° C. from 32.0 J, 33.0 J, or 34.0 J, or 34.2 J to 38.3 J, or 38.5 J, or 39.0 J, or 40.0 J, or 41.0 J, or 42.0 J. A higher IDI total energy dissipation at −20° C. is advantageous because it indicates the material may absorb more impact energy prior to failure.

In an embodiment, the blend has an IDI load at peak at 0° C. from 2500 N, or 2600 N, or 2800 N to 3100 N, or 3200 N, or 3300 N. In an embodiment, the blend has an IDI total energy dissipation at 0° C. from 31.5 J, or 31.8 J, or 31.9 J to 33.9 J, or 34.0 J, or 35.0 J, or 36.0 J, or 40.0 J.

In an embodiment, the blend has an IDI load at peak at 23° C. from 2000 N, or 2300 N to 2500 N, or 2600 N, or 2700 N, or 3000 N. In an embodiment, the blend has an IDI total energy dissipation at 23° C. from 26.7 J to 28.8 J, or 29.0 J, or 30.0 J, or 31.0 J, or 32.0 J.

In an embodiment, the blend has a Notched Izod complete average strength at 0° C. from 32 J/m, or 33 J/m, or 34 J/m, or 34.7 J/m, or 34.8 J/m to 59.3 J/m, or 59.8 J/m, or 59.0, or 60.0 J/m. A higher Notched Izod complete average strength at 0° C. is advantageous because it indicates the material may withstand greater impact energy before failure. In an embodiment, the blend has a Notched Izod complete average strength at 23° C. from 33.6 J/m, or 33.9 J/m, or 39.0 J/m, or 39.1 J/m to 43.5 J/m, or 43.6 J/m, or 43.8 J/m, or 44.0 J/m, or 45.0 J/m. A higher Notched Izod complete average strength at 23° C. is advantageous because it indicates the material may withstand greater impact energy prior to a partial failure.

In an embodiment, the blend has a tensile yield strength from 15 MPa, or 18 MPa to 25 MPa, or 30 MPa, or 35 MPa, or 40 MPa. In an embodiment, the blend has a tensile break strain from 15%, or 18%, or 19% to 25%, or 30%, or 35%. In an embodiment, the blend has a tensile Chord Modulus from 980 MPa, or 985 MPa, or 990 MPa to 1420 MPa, or 1425 MPa, or 1430 MPa, or 1450 MPa, or 1460 MPa, or 1470 MPa.

In an embodiment, the blend contains, consists essentially of, or consists of: (A) from 60 wt %, or 65 wt %, or 70 wt % to 80 wt %, or 85 wt %, or 90 wt %, or 95 wt % ethylene-based polymer (e.g., HDPE); (B) from 5 wt %, or 10 wt %, or 15 wt %, or 20 wt % to 30 wt %, or 35 wt %, or 40 wt % composite component (BC and/or CBC); and (C) optionally, from 0 wt %, or 0.0001 wt %, or 0.001 wt %, or 0.01 wt %, or 0.1 wt % to 0.5 wt %, or 0.8 wt %, or 0.9 wt %, or 1.0 wt %, or 2 wt % additive, based on the total weight of the blend.

In an embodiment, the blend contains, consists essentially of, or consists of: (A) HDPE (density from 0.940 g/cc to 0.970 g/cc) and (B) a composite component selected from BC, CBC, and combinations thereof; and, optionally, (C) an additive. Each component (A), (B), and (C) is present in the ranges set forth in the immediately preceding paragraph above (hereinafter referred to as "Blend 1"). Blend 1 has one, some, or all of the following propertiCes:
(i) a melt index (I2) from 15 g/10 min, or 20 g/10 min, or 24 g/10 min to 35 g/10 min, or 40 g/10 min, or 50 g/10 min; and/or
(ii) a melt index (I10) from 190 g/10 min, or 200 g/10 min, or 205 g/10 min, or 207 g/10 min to 275 g/10 min, or 280 g/10 min, or 285 g/10 min, or 290 g/10 min, or 300 g/10 min; and/or
(iii) a 1% secant modulus from 450 MPa, or 455 MPa, or 460 MPa, or 462 MPa to 625 MPa, or 630 MPa, or 640 MPa, or 650 MPa, or 700 MPa, or 800 MPa, or 900 MPa, or 1000 MPa, or 1100 MPa, or 1200 MPa, or 1300 MPa;
(iv) an IDI load at peak at −20° C. from 3100 N, or 3200 N, or 3300 N to 3400 N, or 3500 N, or 3600 N, or 3700 N, or 3800 N; and/or
(v) an IDI total energy dissipation at −20° C. from 32.0 J, 33.0 J, or 34.0 J, or 34.2 J to 38.3 J, or 38.5 J, or 39.0 J, or 40.0 J, or 41.0 J, or 42.0 J; and/or
(vi) an IDI load at peak at 0° C. from 2600 N, or 2800 N to 3100 N, or 3200 N; and/or
(vii) an IDI total energy dissipation at 0° C. from 31.5 J, or 31.8 J, or 31.9 J to 33.9 J, or 34.0 J, or 35.0 J, or 36.0 J, or 40.0 J; and/or
(viii) an IDI load at peak at 23° C. from 2000 N, or 2300 N to 2500 N, or 2600 N; and/or
(ix) an IDI total energy dissipation at 23° C. from 26.7 J to 28.8 J, or 29.01, or 30.01, or 31.01, or 32.0 J; and/or
(x) a Notched Izod complete average strength at 0° C. from 34.7 J/m, or 34.8 J/m to 59.3 J/m, or 59.8 J/m, or 59.0, or 60.0 J/m; and/or
(xi) a Notched Izod complete average strength at 23° C. from 33.6 J/m, or 33.9 J/m, or 39.0 J/m, or 39.1 J/m to 43.5 J/m, or 43.6 J/m, or 43.8 J/m, or 44.0 J/m, or 45.0 J/m; and/or
(xii) a tensile yield strength from 15 MPa, or 18 MPa to 25 MPa, or 30 MPa; and/or
(xiii) a tensile break strain from 15%, or 18%, or 19% to 25%, or 30%, or 35%; and/or
(xiv) a tensile Chord Modulus from 980 MPa, or 985 MPa, or 990 MPa to 1420 MPa, or 1425 MPa, or 1430 MPa.

All of the components of the blends utilized in the present disclosure may be blended or compounded together prior to their introduction into an extrusion device, or may be directly added to the extrusion device and blended or compounded together within the extrusion device. The polymers and the other additives may be blended together by any of the techniques used in the art to blend and compound such mixtures to homogeneous masses. Compounding of the blends can be effected by standard compounding equipment. Examples of compounding equipment are internal batch mixers, such as a Banbury™ or Boiling™ internal mixer. Alternatively, continuous single, or twin screw, mixers can be used, such as Farrel™ continuous mixer, a Werner and Pfleiderer™ twin screw mixer, or a Buss™ kneading continuous extruder may be utilized.

The blend may comprise two or more embodiments discussed herein.

Applications typically require the plastic living hinge to flex a number of times without breaking. For example, conventional lids for dispensing containers require the plastic living hinge to have a flexural endurance sufficient to perform at least 300, or at least 1000, or at least 5000 opening/closing cycles before breaking.

In an embodiment, the plastic living hinge is composed solely of the present blend. In an embodiment, the plastic living hinge is pinless.

In an embodiment, the plastic living hinge is composed solely of Blend land the plastic living hinge is pinless. The plastic living hinge has a hinge tensile strength retention ratio after 5000 cycles from 5%, or 7% to 47%, or 50% and the blend has an IDI load at peak at −20° C. from 3100 N, or 3200 N, or 3300 N to 3400 N, or 3500 N, or 3600 N, or 3700 N, or 3800 N.

In an embodiment, the plastic living hinge has a shrinkage in the machine direction (MD) of less than 1.7%, or from 0% to 1.66%, or 1.7%. In an embodiment, the plastic living hinge has a shrinkage in the cross direction (CD) of less than 1.4%, or from 0% to 1.31%, or 1.35%, or 1.4%.

In an embodiment, the plastic living hinge has a hinge cycled tension strength from 70 N, or 75 N, or 77 N to 105 N, or 110 N, or 115 N, or 120 N after 100 cycles. In an embodiment, the plastic living hinge has a hinge cycled tension strength from 30 N, or 33 N, or 40 N, or 45 N to 83 N, or 85 N, or 90 N, or 95 N after 1,000 cycles. In an embodiment, the plastic living hinge has a hinge cycled tension strength from 3 N, or 5 N, or 10 N to 46 N, or 50 N, or 55 N, or 60 N, or 65 N after 5,000 cycles.

In an embodiment, the plastic living hinge has a hinge tensile strength retention ratio after 1000 cycles from 35%, or 40%, or 43% to 84%, or 85%, or 90%, or 95%, or 100%. In an embodiment, the plastic living hinge has a hinge tensile strength retention ratio after 5000 cycles from 5%, or 7% to 47%, or 50%, or 55%, or 60%, or 65%, or 70%, or 75%, or 80%, or 85%, or 90%, or 95%, or 100%.

The plastic living hinge may be formed by providing a molding unit having a mold according to processes known in the art and generally described in Plastic Injection Molding, Volume 1-Manufacturing Process Fundamentals by Douglas M. Bryce, introducing a blend as described herein into the mold, closing the molding unit, allowing the introduced blend to be maintained in the molding unit until the termination of a molding cycle, and opening the molding unit and removing the plastic living hinge component from the mold.

In an embodiment, the plastic living hinge contains, consists essentially of, or consists of Blend 1; and the plastic living hinge has one, some, or all of the following properties:
(a) a hinge tensile strength retention ratio after 5,000 cycles from 5%, or 7% to 47%, or 50%; and/or
(b) a shrinkage in the machine direction (MD) from 0% to 1.66%, or 1.7%; and/or
(c) a shrinkage in the cross direction (CD) from 0% to 1.31%, or 1.35%, or 1.4%; and/or
(d) a hinge cycled tension strength from 70 N, or 75 N, or 77 N to 105 N, or 110 N, or 115 N, or 120 N after 100 cycles; and/or
(e) a hinge cycled tension strength from 30 N, or 33 N, or 40 N, or 45 N to 83 N, or 85 N, or 90 N, or 95 N after 1,000 cycles; and/or
(f) a hinge cycled tension strength from 3 N, or 5 N, or 10 N to 46 N, or 50 N, or 55 N, or 60 N, or 65 N after 5,000 cycles; and/or
(g) a hinge tensile strength retention ratio after 1,000 cycles from 35%, or 40%, or 43% to 84%, or 85%, or 90%, or 95%.

In an embodiment, the plastic living hinge is a closure, such as for a diaper wipe container, a wet wipe container, a shampoo bottle, or a ketchup bottle.

The plastic living hinge may comprise two or more embodiments discussed herein

By way of example, and not limitation, some embodiments of the present disclosure will now be described in detail in the following Examples.

EXAMPLES

Sample composite components BC 1, CBC 2, and CBC 3 are prepared with the reaction conditions of Table 1. The catalyst is ([[rel-2',2'''-[(1R,2R)-1,2-cylcohexanediylbis (methyleneoxy-κO)] bis[3-(9H-carbazol-9-yl)-5-methyl[1,1'-biphenyl]-2-olato-κO]](2-)]dimethyl-hafnium). Cocatalyst-1 is a mixture of methyldi(C14-18 alkyl)ammonium salts of tetrakis(pentafluorophenyl)borate, prepared by reaction of a long chain trialkylamine (Armeen™ M2HT, available from Akzo Nobel, Inc.), HCl and Li[B(C6F5)4], substantially as disclosed in U.S. Pat. No. 5,919,983, Ex. 2., which are purchased from Boulder Scientific and used without further purification. Cocatalyst-2 is modified methylalumoxane (MMAO), which is purchased from Akzo Nobel and used without further purification. "DEZ" refers to chain shuttling agent diethylzinc.

TABLE 1

| Material | BC 1 | | CBC 2 | | CBC 3 | |
|---|---|---|---|---|---|---|
| Reactor | 1$^{st}$ Reactor | 2$^{nd}$ Reactor | 1$^{st}$ Reactor | 2$^{nd}$ Reactor | 1$^{st}$ Reactor | 2$^{nd}$ Reactor |
| Reactor Control Temp (° C.) | 95 | 105 | 120 | 115 | 153 | 136 |
| Solvent Feed (lb/hr) | 145 | 145 | 130 | 292 | 441 | 376 |
| Propylene Feed (lb/hr) | 11 | 30 | 2.92 | 58.66 | 6.9 | 77.0 |
| Ethylene Feed (lb/hr) | 20 | 0 | 24.5 | 0.0 | 70.6 | 0 |
| Hydrogen Feed (SCCM) | 15 | 20 | 9.7 | 9.8 | 0 | 0 |
| Reactor Propylene Conc. (g/L) | 2.07 | 2.23 | 1.98 | 1.93 | 0.34 | 2.95 |
| Catalyst Efficiency (gPoly/gM) *1.0E6 | 2.7 | 0.15 | 0.738 | 0.081 | 0.21 | 0.09 |
| Catalyst Flow (lb/hr) | 0.25 | 1.02 | 0.89 | 1.79 | 0.73 | 1.65 |
| Catalyst Conc. (ppm) | 45 | 196 | 40 | 400 | 500 | 500 |
| Cocatalyst-1 Flow (lb/hr) | 0.5 | 1 | 0.80 | 0.96 | 0.73 | 1.65 |
| Cocatalyst-1 Conc. (ppm) | 300 | 2000 | 600 | 6000 | 4693 | 4693 |
| Cocat.-2 Flow (lb/hr) | 1.34 | 1.59 | 0.51 | 0.00 | 0.84 | 0.63 |
| Cocat.-2 Conc. (ppm) | 1494 | 19989 | 3995 | 0 | 1995 | 1995 |
| DEZ Flow (lb/hr) | 1.60 | 0 | 1.65 | 0 | 2.34 | 0 |
| DEZ Conc. (ppm) | 19990 | 0 | 30000 | 0 | 49989 | 0 |

The measured properties of BC 1, CBC 2, and CBC 3 are provided in Table 2.

TABLE 2

|  | MFR (230° C./2.16 kg) (g/10 min) | wt % PP from HTLC Separation | Mw (kg/mol) | Mw/Mn | Total wt % $C_2$ (NMR) | Tm (° C.) Peak 1 (Peak 2) | Tc (° C.) | Melt Enthalpy (J/g) |
|---|---|---|---|---|---|---|---|---|
| BC 1 | 18.2 | 18.3 | 109 | 3.75 | 33.5 | 138 (40) | 85 | 81 |
| CBC 2 | 23.5 | 27.1 | 127 | 4.26 | 28.8 | 136 (105) | 94 | 100 |
| CBC 3 | 18.2 | 18.3 | 109 | 3.75 | 33.5 | 138 (40) | 85 | 81 |

The estimated properties of BC 1, CBC 2, and CBC 3 are provided in Table 3.

TABLE 3

|  | wt % EP | wt % iPP | wt % $C_2$ in EP | wt % $C_2$ in iPP | CBCI | BCI | mol % $C_2$ in EP | mol % $C_2$ in iPP |
|---|---|---|---|---|---|---|---|---|
| BC 1 | 30 | 70 | 65 | 1 | N/A | 0.441 | 73.6 | 1.5 |
| CBC 2 | 31 | 69 | 89.5 | 1 | 0.605 | N/A | 92.7 | 1.5 |
| CBC 3 | 50 | 50 | 92 | 1 | 0.697 | N/A | 94.5 | 1.5 |

Crystalline Block Composite Index (CBCI) Calculations

CBCI provides an estimate of the quantity of block copolymer within the CBC under the assumption that the ratio of CEB to CAOB within the diblock is the same as the ratio of ethylene to α-olefin in the overall CBC. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in these examples, the CAOP) and polyethylene (in these examples, the CEP). Consequently, the polyethylene fraction contains an appreciable amount of propylene that would not otherwise be present if the polymer was simply a blend of polypropylene and polyethylene. To account for this "extra propylene," a mass balance calculation can be performed to estimate the CBCI from the amount of the polypropylene and polyethylene fractions and the wt % propylene present in each of the fractions that are separated by HTLC. The corresponding CBCI calculations for CBC 2 and CBC 3 are provided in Table 4.

TABLE 4

| Line | Variable | Source | CBC 2 | CBC 3 |
|---|---|---|---|---|
| 1 | Overall wt % C3 Total | Measured | 71.2 | 52.4 |
| 2 | wt % C3 in PP block/polymer | Measured | 99 | 99 |
| 3 | wt % C3 in PE block/polymer | Measured | 10.5 | 8.0 |
| 4 | wt fraction PP (in block or polymer) | Eq. 2 below | 0.686 | 0.488 |
| 5 | wt fraction PE (in block or polymer) | 1-Line 4 | 0.314 | 0.512 |
|  | Analysis of HTLC Separation | | | |
| 6 | wt fraction isolated PP | Measured | 0.271 | 0.148 |
| 7 | wt fraction PE fraction | Measured | 0.729 | 0.852 |
| 8 | wt % C3 in PE-fraction | Eq. 4 below | 60.9 | 44.3 |
| 9 | wt fraction PP-diblock in PE fraction | Eq. 6 below | 0.569 | 0.399 |
| 10 | wt fraction PE in PE fraction | 1-Line 10 | 0.431 | 0.601 |
| 11 | wt fraction diblock in PE fraction | 10/Line 4 | 0.830 | 0.818 |
| 12 | CBCI | Eq. 7 below | 0.605 | 0.697 |

Referring to Tables 3 and 4, above, the CBCI is measured by first determining a summation of the weight percent propylene from each component in the polymer according to Equation 1, below, which results in the overall wt % propylene/$C_3$ (of the whole polymer). This mass balance equation can be used to quantify the amount of the PP and PE present in the block copolymer. This mass balance equation can also be used to quantify the amount of PP and PE in a binary blend or extended to a ternary, or n-component blend. For CBC 2 and CBC 3, the overall amount of PP or PE is contained within the blocks present in the block copolymer and the unbound PP and PE polymers.

$$\text{wt \% } C_3 \text{ overall} = w_{PP}(\text{wt \% } C_{3\ PP}) + w_{PE}(\text{wt \% } C_{3\ PE}) \quad \text{Equation 1}$$

where $w_{PP}$ is the weight fraction of PP in the polymer; $w_{PE}$ is the weight fraction of PE in the polymer; wt % $C_{3\ PP}$ is the weight percent of propylene in the PP component or block; and wt % $C_{3\ PE}$ is the weight percent of propylene in the PE component or block.

Note that the overall weight percent of propylene ($C_3$) is measured from $C^{13}$ NMR or some other composition measurement that represents the total amount of $C_3$ present in the whole polymer. The weight percent propylene in the PP block (wt % $C_{3\ PP}$) is set to 100 (if applicable) or if otherwise known from its DSC melting point, NMR measurement, or other composition estimate, that value can be put into its place. Similarly, the weight percent propylene in the PE block (wt % $C_{3\ PE}$) is set to 100 (if applicable) or if otherwise known from its DSC melting point, NMR measurement, or other composition estimate, that value can be put into its place. The weight percent of $C_3$ is shown in Table 4.

Based on Equation 1, the overall weight fraction of PP present in the polymer can be calculated using Equation 2 from the mass balance of the total $C_3$ measured in the polymer. Alternatively, it could also be estimated from a mass balance of the monomer and comonomer consumption during the polymerization. Overall, this represents the amount of PP and PE present in the polymer regardless of whether it is present in the unbound components or in the block copolymer. For a conventional blend, the weight fraction of PP and weight fraction of PE corresponds to the individual amount of PP and PE polymer present. For the CBC, it is assumed that the ratio of the weight fraction of PP to PE also corresponds to the average block ratio between PP and PE present in this statistical block copolymer.

$$W_{PP} = \frac{\text{wt \% } C_{3\,overall} - \text{wt \% } C_{3PE}}{\text{wt \% } C_{3PP} - \text{wt \% } C_{3PE}} \quad \text{Equation 2}$$

where $w_{PP}$ is the weight fraction of PP in the polymer; wt % $C_{3\,PP}$ is the weight percent of propylene in the PP component or block; and wt % $C_{3\,PE}$ is the weight percent of propylene in the PE component or block.

To estimate the amount of the block copolymer (diblock) in the CBC, apply Equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP block present in the diblock copolymer. By substituting the overall weight percent $C_3$ of the whole polymer in the left hand side of Equation 3, and the weight fraction of PP (isolated from HTLC) and the weight fraction of PE (separated by HTLC) into the right hand side of Equation 3, the weight percent of $C_3$ in the PE fraction can be calculated using Equations 4 and 5.

The PE fraction is described as the fraction separated from the unbound PP and contains the diblock and unbound PE. The composition of the isolated PP is assumed to be the same as the weight percent propylene in the PP block as described previously.

$$\text{wt \% } C_{3\,overall} = \quad \text{Equation 3}$$
$$w_{PP\,isolated}(\text{wt \% } C_{3\,PP}) + W_{PE\text{-}fraction}(\text{wt \% } C_{3\,PE\text{-}fraction})$$

$$\text{wt \% } C_{3\,PE\text{-}fraction} = \frac{\text{wt \% } C_{3\,overall} - w_{PP\,isolated}(\text{wt \% } C_{3\,PP})}{W_{PE\text{-}fraction}} \quad \text{Equation 4}$$

$$w_{PE\text{-}fraction} = 1 - w_{PP\,isolated} \quad \text{Equation 5}$$

where $w_{PP\,isolated}$ is the weight fraction of isolated PP from HTLC; $w_{PE\text{-}fraction}$ is the weight fraction of PE separated from HTLC, containing the diblock and unbound PE; wt % $C_{3\,PP}$ is the wt % of propylene in the PP; which is also the same amount of propylene present in the PP block and in the unbound PP; wt % $C_{3\,PE\text{-}fraction}$ is the wt % of propylene in the PE-fraction that was separated by HTLC; and wt % $C_{3\,overall}$ is the overall wt % propylene in the whole polymer.

The amount of wt % $C_3$ in the polyethylene fraction from HTLC represents the amount of propylene present in the block copolymer fraction that is above the amount present in the 'unbound polyethylene.' To account for the 'additional' propylene present in the polyethylene fraction, the only way to have PP present in this fraction, is that the PP polymer chain must be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP\text{-}diblock} = \frac{\text{wt \% } C_{3\,PE\text{-}fraction} - \text{wt \% } C_{3\,PE}}{\text{wt \% } C_{3\,PP} - \text{wt \% } C_{3\,PE}} \quad \text{Equation 6}$$

where wt % $C_{3\,PE\text{-}fraction}$ is the wt % of propylene in the PE-fraction that was separated by HTLC (Equation 4); wt % $C_{3\,PP}$ is the wt % of propylene in the PP component or block (defined previously); wt % $C_{3\,PE}$ is the wt % of propylene in the PE component or block (defined previously); and $w_{PP\text{-}diblock}$ is the weight fraction of PP in the diblock separated with PE-fraction by HTLC.

The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus, the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 7. To estimate the CBCI, the weight fraction of diblock in the PE fraction calculated using Equation 6 is divided by the overall weight fraction of PP (as calculated in Equation 2) and then multiplied by the weight fraction of the PE fraction.

$$CBCI = \frac{w_{PP\text{-}diblock}}{w_{PP}} \times w_{PE\text{-}fraction} \quad \text{Equation 7}$$

where $w_{PP\text{-}diblock}$ is the weight fraction of PP in the diblock separated with the PE-fraction by HTLC (Equation 6); $w_{PP}$ is the weight fraction of PP in the polymer; and $w_{PE\text{-}fraction}$ is the weight fraction of PE separated from HTLC, containing the diblock and unbound PE (Equation 5).

Block Composite Index Calculations

The term Block Composite Index (BCI) is herein defined to equal the weight percentage of the block copolymer divided by 100% (i.e., weight fraction). The value of the BCI can range from 0 up to 1.0, where 1.0 would be equal to 100% of the block copolymer and zero would be for material such as a traditional blend or random copolymer. Said in another way, for an insoluble fraction, the BCI is 1.0, and for a soluble fraction, the BCI is assigned a value of zero. The following is a description for estimating the block composite index (BCI).

Estimation of BCI is based on showing that the insoluble fractions contain an appreciable amount of ethylene that would not otherwise be present if the polymer was simply a blend of iPP homopolymer and EP copolymer. To account for this "extra ethylene," a mass balance calculation can be performed to estimate a block composite index from the amount of xylene insoluble and soluble fractions and the weight percent ethylene present in each of the fractions.

A summation of the weight percent ethylene from each fraction according to Equation 8 results in an overall weight percent ethylene (in the polymer). This mass balance equation can also be used to quantify the amount of each component in a binary blend or extended to a ternary, or n-component blend.

$$\text{wt \% } C_2 \text{ overall} = w_{insoluble}(\text{wt \% } C_{2\,insoluble}) + w_{soluble}$$
$$(\text{wt \% } C_{2\,soluble}) \quad \text{Equation 8}$$

Applying Equations 9 through 11, the amount of the soft block (providing the source of the extra ethylene) present in the insoluble fraction is calculated. By substituting the wt % $C_2$ of the insoluble fraction in the left hand side of Equation 9, the wt % iPP hard and wt % EP soft can be calculated using Equations 10 and 11. Note that the weight percent of ethylene in the EP soft is set to be equal to the wt % ethylene in the xylene soluble fraction. The weight percent ethylene in the iPP block is set to zero or if otherwise known from its DSC melting point or other composition measurement, the value can be put into its place.

$$\text{wt \%} \ C_{2\,overall} = w_{iPPhard}(\text{wt \%} \ C_{2\,iPP}) + w_{EPsoft}(\text{wt \%} \ C_{2\,EPsoft}) \qquad \text{Equation 9}$$

$$w_{iPPhard} = \frac{\text{wt \%} \ C_{2\,xylene\,insoluble} - \text{wt \%} \ C_{2\,EPsoft}}{\text{wt \%} \ C_{2\,iPPhard} - \text{wt \%} \ C_{2\,EPsoft}} \qquad \text{Equation 10}$$

$$w_{EPsoft} = 1 - w_{iPPhard} \qquad \text{Equation 11}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the BCI, the relative amount of each block must be taken into account. To approximate this, the ratio between the EP soft and iPP hard is used. The ratio of the EP soft polymer and iPP hard polymer can be calculated using Equation 9 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 9 and assumes the iPP hard contains no ethylene. The weight percent ethylene of the EP soft is the amount of ethylene present in the xylene soluble fraction.

The corresponding BCI calculations for BC 1 are provided in Table 5.

TABLE 5

| Line | Variable | Source | BC 1 |
|---|---|---|---|
| 1 | Overall wt % C2 Total | Measured | 33.5 |
| 2 | wt % C2 in PP block/polymer | Measured | 0.5 |
| 3 | wt % C2 in EP block/polymer | Measured | 65.0 |
| 4 | wt fraction iPP (in block or polymer) | Calc. | 0.488 |
| 5 | wt fraction EP (in block or polymer) | Calc. | 0.512 |
| 6 | Analysis of HTLC Separation | | |
| 7 | wt fraction xylene soluble | Measured | 0.301 |
| 8 | wt fraction xylene insoluble | Measured | 0.699 |
| 9 | wt % C2 in xylene insoluble | Measured | 21.3 |
| 10 | wt fraction PP in insoluble | Calc. | 0.678 |
| 11 | wt fraction EP in insoluble fraction | 1-Line 10 | 0.322 |
| 12 | wt fraction Diblock in insoluble fraction | Line 11/Line 5 | 0.630 |
| 13 | Block Composite Index (BCI) | Calc | 0.441 |

Other materials used in the examples are provided in Table 6 below.

TABLE 6

| | Materials | |
|---|---|---|
| Material/Description | Properties | Source |
| DOW ™ DMDA-8940 (ethylene/1-hexene copolymer) (HDPE) | MI (I2)(190° C./2.16 kg) = 44 g/10 min, Density = 0.953 g/cc, Melting point = 128° C. | The Dow Chemical Company |
| Polypropylene D115A (propylene homopolymer) | MFR (230° C./2.16 kg) = 11 g/10 min | Braskem |
| Polypropylene 5D49 propylene homopolymer) | MFR (230° C./2.16 kg) = 38 g/10 min | Braskem |

Blend formulations are generated in a 30 mm co-rotating, intermeshing Coperion Werner-Pfleiderer ZSK-30 twin screw extruder, and then pelletized for the subsequent injection molding process. The ZSK-30 has ten barrel sections with an overall length of 960 mm and a length/diameter (L/D) ratio of 32. The temperature is set at 80° C. (zone 1–feed), 160° C. (zone 2), 180° C. (zone 3), 185° C. (zone 4), 195° C. (zone 5), and 210° C. (die). The blend formulations are provided below in Table 7.

The blends are injection molded into standard ASTM Type 1 bars using a mirrored finished mold on a KRAUSS MAFFEI KM110 injection molding machine. The blend is melted at 200° C. and injected at a pressure of 200,000 kilopascal (kPa) (2000 bar) over 3.0-3.5 seconds. The mold temperature is held at 15-38° C. Mold pressure is maintained at 20,000-30,000 kPa (200-300 bar), depending on the material composition, for 30 seconds. The samples are then cooled for 20 seconds. Stress-strain behavior in uniaxial tension is measured according to ASTM D638. Injection molded samples are stretched with an INSTRON™ machine at 508 mm/min (20.0 inch/min) with a gauge length of 114 mm (4.5 inches) at 23° C. Tensile strengths and elongation at break are measured and reported for an average of 5 specimens of each sample. The results are reported in Table 7. In Table 7, "CS" refers to comparative samples.

Each blend sample is formed into a plastic living hinge by injection molding. Injection molded samples are produced on a Toyo 90 ton electric injection molding machine. An 80 ton clamp tonnage is used for all blend samples. Transfer from fill to pack is done on screw position. The mold is a 1-cavity living hinge strip insert. The mold is heated to 23.9° C. (75° F.) using water and an external Matsui mold controller. The parts are filled using a fan gate. The plastic living hinge 10 is depicted in FIGS. 1A, 1B, and 1C. The plastic living hinge strip dimensions are 7.62 cm×1.27 cm×0.250 cm (3 in×0.5 in×0.098 in). The hinge is located at the center of the strip, forming a valley spanning across the short dimension of one of the large faces of the strip. The opposing large face of the strip is flat. As shown in FIGS. 1B and 1C, the hinge region is semi-circular, with a radius of curvature of 0.508 mm (0.02 inch) and is 0.381 mm (0.015 inch) thick at the thinnest point from the bottom of the semicircle to the surface of the opposing large face. There are 2 tapered regions connecting the semicircular hinge region to the rest of the plastic living hinge strip. Hinge tensile strength of the plastic living hinge samples is measured after 100 cycles, 1,000 cycles, and 5,000 cycles. The results are reported in Table 7.

TABLE 7

| | | CS 1 | CS 2 | CS 3 | CS 4 | Ex. 1 | Ex. 2 | Ex. 3 |
|---|---|---|---|---|---|---|---|---|
| DMDA-8940(HDPE) | | 100 | 90 | 70 | 70 | 70 | 85 | 70 |
| BC 1 | | — | — | — | — | 30 | 15 | — |
| CBC 2 | | — | — | — | — | — | — | 30 |
| CBC 3 | | — | — | — | — | — | — | — |
| Polypropylene 5D49 | | — | 10 | 30 | — | — | — | — |
| Polypropylene D115A | | — | — | — | 30 | — | — | — |
| Total (wt %) | | 100 | 100 | 100 | 100 | 100 | 100 | 100 |
| Melt Index (g/10 min) | I2 (190° C./2.16 kg) | 44 | NM | NM | NM | 24.6 | 32.0 | 27.4 |
| | I10 (190° C./10 kg) | NM | NM | NM | NM | 207.6 | 251.4 | 238.0 |
| Melt Flow Rate (g/10 min) | 230° C./2.16 kg | NM | NM | NM | NM | NM | NM | NM |
| 1% Secant Flexural Modulus (MPa) | | 594.5 | 623.4 | 783.8 | 786.2 | 462.8 | 527.6 | 622.4 |
| Instrumented Dart Impact | Load at Peak (N) | 3412 | 3083 | 1641 | 1561 | 3234 | 3390 | 3572 |
| (IDI) at −20° C. | Total Energy Dissipation (J) | 31.4 | 21.5 | 3.8 | 4.0 | 38.2 | 36.5 | 38.3 |
| | Failure Mode[A] | 4D/1B | 5B | 5B | 5B | 5D | 5D | 4D/1B |
| Instrumented Dart Impact | Load at Peak (N) | 2976 | 2713 | 1508 | 1312 | 2624 | 2856 | 3065 |
| (IDI) at 0° C. | Total Energy Dissipation (J) | 31.4 | 17.4 | 4.6 | 34 | 32.9 | 33.0 | 33.9 |
| | Failure Mode[A] | 5D | 5B | 5B | 5B | 5D | 5D | 5D |
| Instrumented Dart Impact | Load at Peak (N) | 2504 | 2362 | 1299 | 1250 | 2055 | 2322 | 2362 |
| (IDI) at 23° C. | Total Energy Dissipation (J) | 26.6 | 18.3 | 5.0 | 4.4 | 27.7 | 28.8 | 26.7 |
| | Failure Mode[A] | 5D | 5B | 5B | 5B | 5D | 5D | 4D/1B |
| Notched Izod at 0° C. | Complete Avg. Strength (J/m) | 34.7 | 26.1 | 21.7 | 21.7 | 59.0 | 42.6 | 34.7 |
| | Partial Avg. Strength (J/m) | N/A | N/A | N/A | N/A | N/A | N/A | N/A |
| | Break Type[B] | 5C | 5C | 5C | 5C | 5C | 5C | 5C |
| Notched Izod at 23° C. | Complete Avg. Strength (J/m) | 37.4 | 28.7 | 21.7 | 21.7 | N/A | 43.5 | 39.1 |
| | Partial Avg. Strength (J/m) | N/A | N/A | N/A | N/A | 138.7 | N/A | N/A |
| | Break Type[B] | 5C | 5C | 5C | 5C | 5P | 5C | 5C |
| Tensile | Yield Strength (MPa) | 25.1 | 25.0 | 27.9 | 28.2 | 18.1 | 21.1 | 23.5 |
| (Cross Head Speed = 50.8 cm/min) | Break Strain (%) | 18 | 12 | 10 | 8 | 25 | 21 | 21 |
| | Chord Modulus (MPa) | 1475.6 | 1477.1 | 1602.0 | 1657.3 | 992.4 | 1203.1 | 1360.2 |
| Shrinkage | Machine Direction (MD) (%) | 2.07 | NM | 1.58 | NM | 1.47 | NM | 1.58 |
| | Cross Direction (CD) (%) | 1.43 | NM | 1.25 | NM | 1.31 | NM | 1.22 |
| | MD/CD | 1.44 | NM | 1.26 | NM | 1.29 | NM | 1.35 |
| Hinge Cycled Tensile | 100 cycles | 68.0 | 99.1 | 104.7 | 110.4 | 98.9 | 91.4 | 104.1 |
| Strength (N) | 1000 cycles | 19.4 | 33.9 | 62.1 | 62.4 | 82.3 | 49.4 | 69.7 |
| | 5000 cycles | 0.0 | 11.3 | 30.2 | 35.3 | 45.8 | 14.5 | 33.1 |
| Hinge Tensile Strength | After 1000 cycles | 28.5 | 34.2 | 59.3 | 56.6 | 83.2 | 54.0 | 67.0 |
| Retention Ratio (%) | After 5000 cycles | 0.0 | 11.4 | 28.9 | 32.0 | 46.3 | 15.9 | 31.8 |

| | | Ex. 4 | Ex. 5 | Ex. 6 | CS 5 | CS 6 |
|---|---|---|---|---|---|---|
| DMDA-8940(HDPE) | | 85 | 70 | 85 | — | — |
| BC 1 | | — | — | — | — | — |
| CBC2 | | 15 | — | — | — | — |
| CBC 3 | | — | 30 | 15 | — | — |
| Polypropylene 5D49 | | — | — | — | 100 | — |
| Polypropylene D115A | | — | — | — | — | 100 |
| Total (wt %) | | 100 | 100 | 100 | 100 | 100 |
| Melt Index (g/10 min) | I2 (190° C./2.16 kg) | 32.8 | 28.8 | 34.9 | NM | NM |
| | I10 (190° C./10 kg) | 274.9 | 245.2 | 274.1 | NM | NM |
| Melt Flow Rate (g/10 min) | 230° C./2.16 kg | NM | NM | NM | 11 | 38 |
| 1% Secant Flexural Modulus (MPa) | | 621.4 | 594.3 | 592.0 | 1073.8 | 1269.7 |
| Instrumented Dart Impact | Load at Peak (N) | 3550 | 3474 | 3519 | 1241 | 1370 |
| (IDI) at −20° C. | Total Energy Dissipation (J) | 34.2 | 37.2 | 36.7 | 2.1 | 2.7 |
| | Failure Mode[A] | 4D/1B | 5D | 5D | 5B | 5B |
| Instrumented Dart Impact | Load at Peak (N) | 3043 | 2887 | 3003 | 1263 | 1277 |
| (IDI) at 0° C. | Total Energy Dissipation (J) | 31.9 | 32.0 | 32.5 | 3.1 | 4.7 |
| | Failure Mode[A] | 5D | 5D | 5D | 5B | 5B |
| Instrumented Dart Impact | Load at Peak (N) | 2482 | 2340 | 2447 | 3038 | 1819 |
| (IDI) at 23° C. | Total Energy Dissipation (J) | 27.1 | 28.1 | 28.2 | 29.4 | 6.2 |
| | Failure Mode[A] | 5D | 5D | 5D | 1D/4B | 5B |
| Notched Izod at 0° C. | Complete Avg. Strength (J/m) | 34.7 | 39.1 | 34.7 | 21.7 | 21.7 |
| | Partial Avg. Strength (J/m) | N/A | N/A | N/A | N/A | N/A |
| | Break Type[B] | 5C | 5C | 5C | 5C | 5C |
| Notched Izod at 23° C. | Complete Avg. Strength (J/m) | 33.9 | 43.5 | 39.1 | 29.6 | 33.9 |
| | Partial Avg. Strength (J/m) | N/A | N/A | N/A | N/A | N/A |
| | Break Type[B] | 5C | 5C | 5C | 5C | 5C |
| Tensile | Yield Strength (MPa) | 24.0 | 21.0 | 22.8 | 33.2 | 37.2 |
| (Cross Head Speed = 50.8 cm/min) | Break Strain (%) | 19 | 21 | 19 | 25 | 14 |
| | Chord Modulus (MPa) | 1415.9 | 1223.2 | 1341.5 | 1488.9 | 1667.1 |
| Shrinkage | Machine Direction (MD) (%) | NM | 1.66 | NM | 0.95 | 1.11 |
| | Cross Direction (CD) (%) | NM | 1.23 | NM | 1.01 | 1.13 |
| | MD/CD | NM | 1.12 | NM | 0.94 | 0.98 |

TABLE 7-continued

|  |  |  |  |  |  |  |
|---|---|---|---|---|---|---|
| Hinge Cycled Tensile Strength (N) | 100 cycles | 89.1 | 89.2 | 77.4 | 214.9 | 297.8 |
|  | 1000 cycles | 49.9 | 51.9 | 33.5 | 207.6 | 289.7 |
|  | 5000 cycles | 13.3 | 17.6 | 5.8 | 193.3 | 236.0 |
| Hinge Tensile Strength Retention Ratio (%) | After 1000 cycles | 56.0 | 58.1 | 43.3 | 96.6 | 97.3 |
|  | After 5000 cycles | 15.0 | 19.7 | 7.5 | 89.9 | 79.3 |

<sup>A</sup>Failure Mode of "5D" indicates 5 ductile failures; "5B" indicates 5 brittle failures: "4D/1B" indicates 4 ductile failures and 1 brittle failure; and "1D/4B" indicates 1 ductile failure and 4 brittle failures.
<sup>B</sup>Break Type "5C" indicates 5 complete breaks; "5P" indicates 5 partial breaks.
NM = Not Measured; N/A = not applicable.

As shown, a comparative plastic living hinge containing HDPE (CS 1) and no block composite exhibits a poor hinge tensile strength retention ratio (28.5% after 1000 cycles and 0% after 5000 cycles) and high shrinkage (2.07% MD and 1.43% CD).

Comparative plastic living hinges containing a blend of HDPE and propylene homopolymer (CS 2, CS 3, CS 4) and no block composite exhibit poor low temperature impact resistance, evidenced by a low total energy dissipation at −20° C. (≤21.5 J) and 0° C. (≤17.4 J), and a low load at peak at −20° C. (≤3083 N) and 0° C. (≤2713 N). Comparative plastic living hinges containing HDPE and propylene homopolymer (CS 2, CS 3, CS 4) and no block composite also exhibit a poor low temperature Notched Izod strength (complete average strength of ≤26.1 J/m at 0° C.).

Comparative plastic living hinges containing propylene homopolymer (CS 5, CS 6) and lacking HDPE and a block composite exhibit poor low temperature impact resistance, evidenced by a low total energy dissipation at −20° C. (≤2.7 J) and 0° C. (≤4.7 J), and a low load at peak at −20° C. (≤1370 N) and 0° C. (≤1277 N). Comparative plastic living hinges containing propylene homopolymer (CS 5, CS 6) and lacking HDPE and a block composite also exhibit a poor low temperature Notched Izod strength (complete average strength of ≤21.7 J/m at 0° C.).

Applicant surprisingly found that a plastic living hinge containing a blend of HDPE and block composite (Ex. 1-Ex. 6) advantageously exhibits a balance of (i) an improved hinge tensile strength retention ratio (≥43.3% after 1000 cycles and ≥7.5% after 5000 cycles); (ii) improved low temperature impact resistance, evidenced by a high total energy dissipation at −20° C. (≥34.2 J) and 0° C. (≥31.9 J), and a high load at peak at −20° C. (≥3234 N) and 0° C. (≥2624 N); (iii) improved low temperature Notched Izod strength (complete average strength of ≥234.7 J/m at 0° C.); and (iv) low shrinkage (≤1.66% MD and ≤1.31% CD).

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A plastic living hinge consisting of:
   a blend consisting of
   (A) from 60 wt % to 95 wt % of a single ethylene-based polymer;
   (B) from 40 wt % to 5 wt % of a composite component selected from the group consisting of a block composite, a crystalline block composite, and a combination thereof; and
   (C) optional additives.

2. The plastic living hinge of claim 1, wherein the ethylene-based polymer is a high density polyethylene having a density from 0.940 g/cc to 0.970 g/cc.

3. The plastic living hinge of claim 1, wherein the composite component is a crystalline block composite.

4. The plastic living hinge of claim 3, wherein the crystalline block composite comprises:
   (i) a crystalline ethylene/propylene copolymer (CEP);
   (ii) a propylene homopolymer (iPP); and
   (iii) a block copolymer comprising an iPP block and a CEP block.

5. The plastic living hinge of claim 3, wherein the blend comprises:
   (A) from 70 wt % to 85 wt % high density polyethylene;
   (B) from 30 wt % to 15 wt % crystalline block composite; and
   the plastic living hinge has a hinge tensile strength retention ratio after 5000 cycles from 5% to 50%; and the blend has an instrumented dart impact at −20° C. load at peak from 3100 N to 3800 N.

6. The plastic living hinge of claim 1 wherein the composite component is a block composite.

7. The plastic living hinge of claim 1, wherein the blend has an instrumented dart impact at −20° C. total energy dissipation from 32.0 J to 42.0 J.

8. The plastic living hinge of claim 1 comprising an additive.

9. The plastic living hinge of claim 1 wherein the plastic living hinge is a closure for an article selected from the group consisting of a diaper wipe container, a wet wipe container, a shampoo bottle, and a ketchup bottle.

10. The plastic living hinge of claim 1 consisting of:
    a blend consisting of
    (A) high density polyethylene;
    (B) composite component; and
    (C) from 0.0001 wt % to 2 wt % optional additives.

* * * * *